US012640959B1

(12) United States Patent
Haefner et al.

(10) Patent No.: US 12,640,959 B1
(45) Date of Patent: May 26, 2026

(54) SYSTEMS AND METHODS FOR PROVIDING A PLURALITY OF NETWORK INTERFACES AT A COMMON LOCATION

(71) Applicant: Cable Television Laboratories, Inc., Louisville, CO (US)

(72) Inventors: Kyle Haefner, Fort Collins, CO (US); Randy Levensalor, Boulder, CO (US); Mark Bridges, Brooks, GA (US); David Daniel Smith, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 568 days.

(21) Appl. No.: 17/366,942

(22) Filed: Jul. 2, 2021

Related U.S. Application Data

(60) Provisional application No. 63/047,652, filed on Jul. 2, 2020.

(51) Int. Cl.
| | |
|---|---|
| *H04L 45/00* | (2022.01) |
| *H04L 12/46* | (2006.01) |
| *H04L 12/66* | (2006.01) |

(52) U.S. Cl.
CPC .............. *H04L 12/46* (2013.01); *H04L 12/66* (2013.01)

(58) Field of Classification Search
CPC ................................ H04L 12/46; H04L 12/66
USPC ........................................................ 370/254
See application file for complete search history.

(56) References Cited

U.S. PATENT DOCUMENTS

| | | | | |
|---|---|---|---|---|
| 11,700,211 | B2 * | 7/2023 | Salinger .............. | H04L 41/0896 |
| | | | | 725/109 |
| 2013/0308565 | A1 * | 11/2013 | Riegel ................... | H04W 76/15 |
| | | | | 370/329 |
| 2015/0039966 | A1 * | 2/2015 | Fonseka ............ | H03M 13/2742 |
| | | | | 714/752 |
| 2015/0180653 | A1 * | 6/2015 | Nix ........................ | H04L 9/3249 |
| | | | | 380/259 |
| 2018/0006870 | A1 * | 1/2018 | Mcchord ............. | H04L 41/0806 |
| 2018/0019945 | A1 * | 1/2018 | Donley .............. | H04L 41/0816 |
| 2018/0034698 | A1 * | 2/2018 | Perez .................... | H04L 41/0886 |
| 2018/0077016 | A1 * | 3/2018 | Onno .................. | H04L 41/0813 |
| 2018/0109819 | A1 * | 4/2018 | Lu ....................... | H04N 21/2387 |
| 2019/0090140 | A1 * | 3/2019 | Bahr ..................... | H04W 16/26 |
| 2020/0136855 | A1 * | 4/2020 | McBride ............. | H04L 12/2876 |

* cited by examiner

*Primary Examiner* — Nicholas P Celani
*Assistant Examiner* — Karina J Garcia-Ching
(74) *Attorney, Agent, or Firm* — PdZ Patent Law, PLLC

(57) ABSTRACT

A method for providing a plurality of network interfaces at a common location includes (1) communicatively interfacing a first local area network with a communication service provider's network via a first child gateway of a parent gateway, and (2) communicatively interfacing a second local area network with the communication service provider's network via a second child gateway of the parent gateway. Each child gateway may have a respective profile, and each child gateway may have a different respective identity with respect to the communication service provider.

17 Claims, 18 Drawing Sheets

SYSTEMS AND METHODS FOR PROVIDING A PLURALITY OF NETWORK INTERFACES AT A COMMON LOCATION

RELATED APPLICATIONS

This application claims benefit of priority to U.S. Provisional Patent Application Ser. No. 63/047,652, filed on Jul. 2, 2020, which is incorporated herein by reference.

BACKGROUND

Broadband communication service has become nearly ubiquitous in modern society. For example, essentially all urban areas have access to broadband communication service from one or more communication service providers, such as cable communication service providers, cellular wireless communication service providers, satellite wireless communication service providers, and telecommunications service providers. As another example, broadband communication service is now available on many airplanes and on many cruise ships.

Additionally, bandwidth of broadband communication service is steadily increasing. For example, next generation cable communication networks are anticipated to support bandwidths of 10 gigabits per second (Gpbs) or even greater. As another example, passive optical networks (PONs) routinely support bandwidths of at least 1 Gpbs, and emerging fifth generation (5G) cellular wireless communication networks promise to offer bandwidth of at least several hundred megabits per second (Mpbs) under typically operating conditions.

DETAILED DESCRIPTION OF THE EMBODIMENTS

Figure 1:
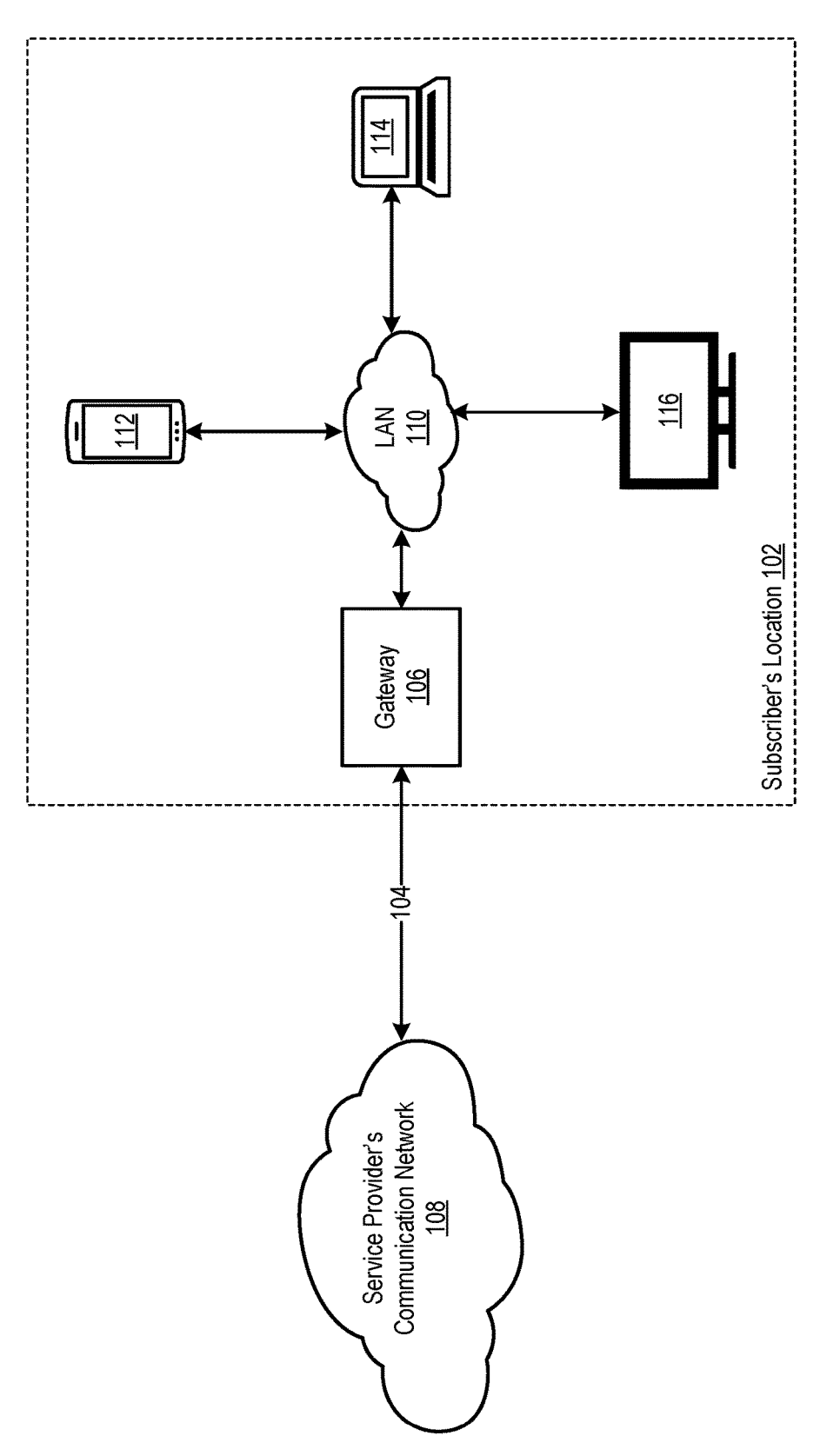
FIG. 1 is a block diagram of a conventional communication system for providing a single network interface at a subscriber's location.

Communication service providers conventionally provide a single network interface at a subscriber's location for the subscriber to access the service provider's network. This single network interface is typically embodied by a gateway or modem, and the subscriber uses a local area network to share the network interface with multiple clients at the location. For example, FIG. 1 is a block diagram of a conventional communication system 100 supporting a single network interface at a subscriber's location 102. A communication link 104 communicatively couples a gateway 106 at subscriber's location 102 with a service provider's communication network 108. Gateway 106 communicatively interfaces a local area network (LAN) 110 with service provider's communication network 108. LAN 110 communicatively couples network clients 112, 114, and 116 with gateway 106, so that the clients can access the gateway.

Gateway 106 serves as a single network interface to service provider's communication network 108 at subscriber's location 102. Accordingly, clients 112, 114, and 116 share a common network identifier associated with gateway 106, such as a common public Internet Protocol (IP) address and/or a common subscriber identifier. Consequently, it may be difficult, or even essentially impossible, for the service provider to individually provision services to clients at subscriber's location 102. For example, it may not be feasible for the service provider to provision client 112, 114, and 116 at different service levels. Additionally, all clients 112, 114, and 116 at subscriber's location 102 share available bandwidth of communication link 104. Such sharing of bandwidth may be undesirable, such as if one client uses a large amount of the available bandwidth and thereby deprives other clients of needed bandwidth. Furthermore, it may not be possible to individually configure gateway 106 for each client 112, 114, and 116. Additionally, it may be cumbersome to configure gateway 106 so that groups of clients have common configurations. For example, it may not be possible to automatically configure common domain name system (DNS) settings in gateway 106 for a group of clients. Instead, DNS settings may need to be individually manually configured for each client of the group. Moreover, there may be security issues with multiple clients sharing a common network interface to service provider's communication network 108, such as in situations where clients 112, 114, and 116 are operated by different parties, e.g., by roommates in a common residence or by multiple tenants in a common building.

Disclosed herein are systems and methods for providing a plurality of network interfaces at a common location, which may at least partially overcome the above-discussed problems associated with sharing a single network interface among multiple clients at a subscriber's location. Certain embodiments of the new systems advantageously use a single communication link to support multiple network interfaces at a subscriber's location. For example, a parent gateway served by a single communication link may support a plurality of child gateways. Each child gateway may be configured to interface a respective LAN with the service provider's communication network, such that the single communication link supports multiple networks at the subscriber's location. Additionally, in some embodiments, each child gateway has a different identity with respect to the service provider's communication network, thereby enabling the service provider to individually provision each child gateway and thereby support differing service levels among LANs at the subscriber's location. Furthermore, in some embodiments, each child gateway can be individually configured, thereby enabling customization of settings among the respective LANs supported by the child gateways.

Figure 2:
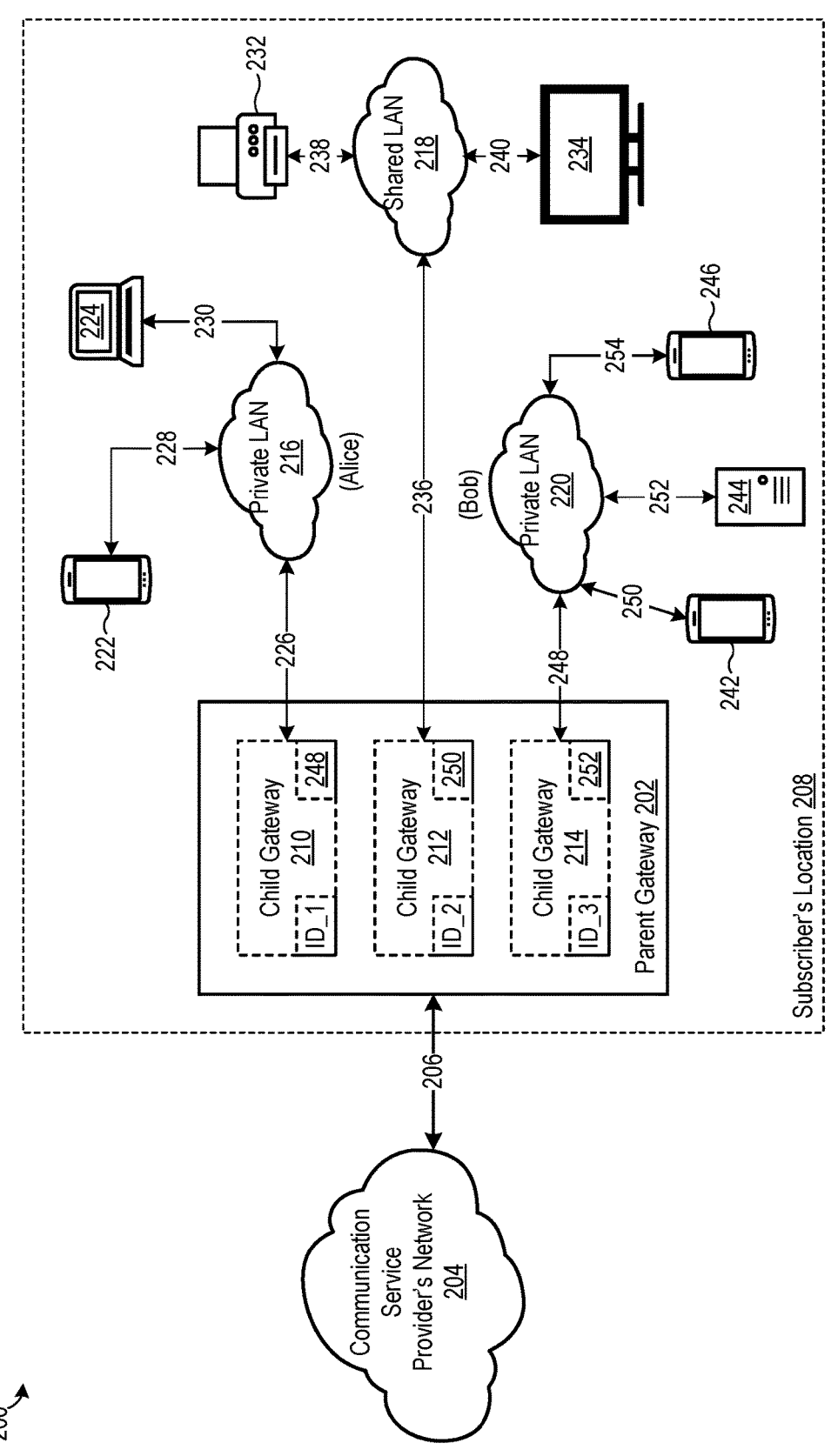
FIG. 2 is a block diagram of a communication system configured to provide a plurality of network interfaces at a subscriber's location, according to an embodiment.

FIG. 2 is a block diagram of a communication system 200, which is one embodiment of the new systems disclosed herein configured to provide a plurality of network interfaces at a common location. Communication system 200 includes a parent gateway 202, a communication service provider's network 204, and a communication link 206. Parent gateway 202 is at a subscriber's location 208, where the subscriber is a party (e.g., a person or an organization) that subscribes to one or more communication services from the communication service provider. Subscriber's location 204 is, for example, a building or a portion of a building (e.g., a home or a business), a non-building structure (e.g., a wireless base station site or a utility infrastructure site), or a plot of land (e.g., a campground or an outdoor recreation site).

Communication link 206 communicatively couples parent gateway 202 with communication service provider's network 204. Communication service provider's network 204, which is henceforth referred to as provider's network 204 for brevity, is configured to provide communication services to clients at subscriber's location 208. Examples of network 204 include, but are not limited to, a cable communication network, a telecommunications network, a cellular wireless communication network, and a satellite wireless communication network. In some embodiments, provider's network 204 is configured to provide clients at subscriber's location 208 access to the public Internet and/or other network resources.

Examples of communication link 206 include, but are not limited to, an electrical communication link (e.g., a coaxial electrical cable communication link or a twisted pair electrical cable communication link), an optical communication link (e.g., an optical cable communication link or a free-space optical communication link), and a radio frequency (RF) communication link (e.g., a cellular wireless communication link, a satellite wireless communication link, a fixed wireless communication link, or a WiFi wireless communication link). Additionally, communication link 206 could be a combination of two or more different types of communication links. For example, communication link 206 could be a hybrid wireline communication link (e.g., an electrical or optical cable communication link) and wireless communication link (e.g., cellular, WiFi, or satellite wireless communication link). As another example, communication link 206 could be a hybrid optical cable and electrical cable (e.g., coaxial electrical cable or twisted pair electrical cable) communication link. Communication link 206 may include termination hardware, such as a modem, a modem termination system, an optical line terminal (OLT), an optical network unit (ONU), an optical network termination (ONT), an RF transceiver, an optical transceiver, etc. However, in some embodiments, termination hardware for communication link 206 at subscriber's location 208 is partially or fully incorporated in parent gateway 202. For example, some embodiments of parent gateway 202 include a modem (not shown) or ONT (not shown) configured to interface parent gateway 202 with a communication medium of communication link 206.

In contrast to a conventional gateway, such as gateway 106 of FIG. 1, parent gateway of FIG. 2 is configured to support a plurality of child gateways, where each child gateway provides a respective network interface to provider's network 204. FIG. 2 depicts parent gateway 202 supporting three child gateways, i.e., child gateways 210, 212, and 214, but the number of child gateways supported by parent gateway 202 may vary without departing from the scope hereof. In some embodiments, provider's network 204 is configured to authenticate child gateways 210, 212, and 214, and each child gateway is configured to authenticate provider's network 204. Some embodiments of child gateways 210, 212, and 214 are virtual gateways, i.e., they are embodied by one or more processors (not shown) of parent gateway 202 executing instructions in the form of software and/or firmware stored in one or more memories (not shown) of parent gateway 202. In such embodiments, the number of child gateways supported by parent gateway 202 is optionally dynamically configurable. For example, a subscriber could purchase an additional child gateway from the communication service provider, and in response, provider's network 204 could provision an additional child gateway instance in parent gateway 202.

Child gateways 210, 212, and 214 are not limited to being virtual gateways, however. For example, in certain embodiments, at least portions of child gateways 210, 212, and 214 are embodied by different respective hardware within parent gateway 202.

Each child gateway 210, 212, and 214 is configured to exchange data with provider's network 204. Additionally, each child gateway 210, 212, and 214 is optionally configured to communicatively interface a respective LAN at subscriber's location 208 with provider's network 204, such as illustrated in FIG. 2. For example, child gateway 210 communicatively interfaces a LAN 216 with provider's network 204, child gateway 212 communicatively interfaces a LAN 218 with provider's network 204, and child gateway 214 communicatively interfaces a LAN 220 with provider's network 204. Accordingly, each LAN 216, 218, and 220 has a dedicated network interface with provider's network 204.

LANs 216 and 220 are "private" LANs, which means that they are intended for use by only a single party or by less than all parties associated with subscriber's location 208. For example, in applications where subscriber's location 208 is a home, a private LAN may be intended for use by only a single resident of the home, or by a subset of residents of the home. As another example, in applications where subscriber's location 208 is a commercial building including multiple businesses, a private LAN may be intended for use by only one of the businesses. As yet another example, in an application where subscriber's location 208 is a wireless tower site shared by multiple cellular wireless communica- tion service providers, a private LAN may be intended for use by only one of the cellular wireless communication service providers. A shared LAN, in contrast, is intended for use by multiple parties at a subscriber's location. For example, in an application where subscriber's location 208 is a home, a shared LAN may be intended for use by all residents of the home. As another example, in an application where a subscriber's location 208 is a hotel, a shared LAN may be intended for use by all guests of the hotel.

Each LAN 216, 218, and 220 is configured to communi- catively couple one or more clients with a respective child gateway 210, 212, and 214 of the LAN. For example, FIG. 2 illustrates private LAN 216 communicatively coupling clients 222 and 224 with child gateway 210 via logical connections 226, 228, and 230, and FIG. 2 also illustrates shared LAN 218 communicatively coupling clients 232 and 234 to child gateway 212 via logical connections 236, 238, and 240. Furthermore, FIG. 2 illustrates private LAN 220 communicatively coupling clients 242, 244, and 246 with child gateway 214 via logical connections 248, 250, 252, and 254. However, the number of clients handled by each LAN 216, 218, and 220 may vary. Additionally, the types of clients handled by each LAN 216, 218, and 220 may vary. For example, while FIG. 2 depicts clients 222, 242, and 246 as being smart phones, client 224 as being a computer, client 232 as being a printer, client 234 as being a smart television, and client 244 as being a server, any of these clients could take a different form without departing from the scope hereof.

Each of LANs 216, 218, and 220 is depicted as being logically configured in a star configuration. However, FIG. 2 should not be construed to require any physical or logical configuration of LANs 216, 218, and 220. Rather, LANs 216, 218, and 220 can have essentially any configuration as long as they are capable of communicatively coupling their clients with child gateways 210, 212, and 214, respectively. For example, LANs 216, 218, and 220 may include electri- cal wireline communication links (e.g., Ethernet electrical cable communication links, coaxial electrical cable commu- nication links, telephone electrical cable communication links, or powerline communication links), optical wireline communication links (e.g., fiber optic cable communication links), wireless communication links (e.g., WiFi wireless communication links, fixed wireless communication links, cellular wireless communication links, satellite wireless communication links, Bluetooth wireless communication links), or a combination of two or more of any of the aforesaid communication links.

Additionally, while FIG. 2 depicts LANS 216, 218, and 220 as being separate from parent gateway 202, any one of these LANs may be partially or fully integrated in parent gateway 202. For example, in a particular embodiment, private LAN 216 includes a WiFi wireless network where a wireless access point of the network is integrated in parent gateway 202. As another example, in certain embodiment, shared LAN 218 includes a wired Ethernet network, and parent gateway 202 includes an Ethernet switch with physi- cal ports for Ethernet electrical cables. Furthermore, although LANs 216, 218, and 220 are depicted as being logically separate, two or more of these LANs may share at least some hardware. Accordingly, two or more of LANs 216, 218, and 220 may be virtual LANs (VLANs) or virtual extensible LANs (VXLANs) supported by common hard- ware. Generic routing encapsulation (GRE) tunnels may also be used to implement LANs 216, 218, and 220.

In some embodiments, each child gateway 210, 212, and 214 is individually configurable via a respective profile 248, 250, and 252, where each profile 248, 250, and 252 specifies a configuration of its respective child gateway 210, 212, and 214. In some embodiments, profiles 248, 250, and 252 may be edited by the communication service provider via com- munication link 206, such that the communication service provider can remotely configure each child gateway 210, 212, and 214 and its associated LAN 216, 218, and 220. Additionally, in certain embodiments, each profile 210, 212, and 214 may be edited by a party associated with subscrib- er's location 208, thereby enabling customization of child gateways 210, 212, and 214 by associated subscribers. For example, assume that child gateway 210 and private LAN 216 are associated with a person named Alice and that child gateway 214 and private LAN 220 are associated with a person named Bob. Parent gateway 202 may be configured such that Alice can edit profile 248 and thereby customize her child gateway 210 and associated private LAN 216, and parent gateway 202 may also be configured such that Bob can edit profile 252 and thereby customize his child gateway 214 and associated private LAN 220. Such ability to cus- tomize each child gateway 210, 212, and 214 and its associated LAN 216, 218, and 220 is not possible in con- ventional communication systems with a single gateway at a subscriber's location.

Figure 3:
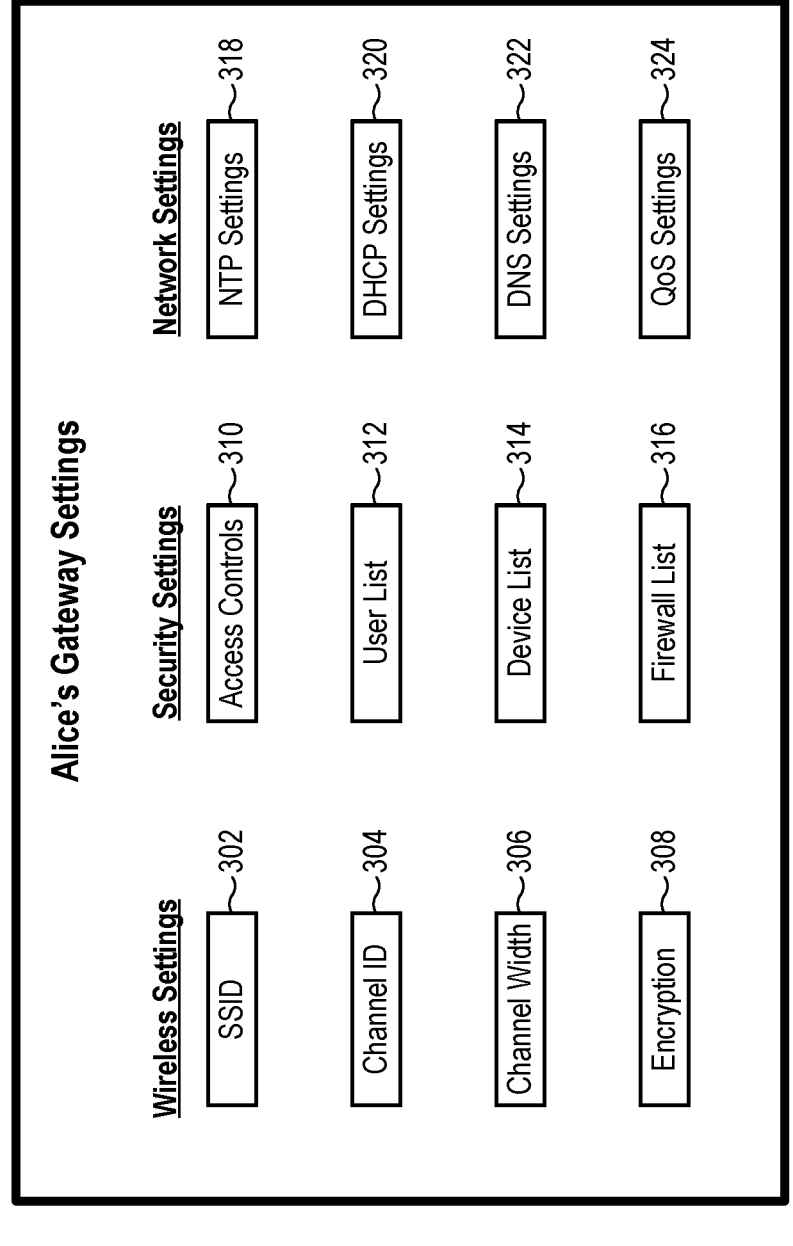
FIG. 3 is an illustration of an example graphical user interface for editing a child gateway profile of the FIG. 2 system.

In some embodiments, parent gateway 202 is configured so that each profile 248, 250, and 252 may be edited via an application program interface (API). Alternately, or addi- tionally, parent gateway 202 may be configured so that each child gateway 210, 212, and 214 supports a user portal to enable a party associated with the child gateway to edit its associated profile. For example, FIG. 3 is an illustration of an example graphical user interface (GUI) 300 of a user portal for child gateway 210 which enables a user associated with child gateway 210, such as Alice from the example above, to edit profile 248. Each other profile 250 and 252 could be individually editable via a similar GUI. For example, in some embodiments, Bob from the example above could access a GUI like that of FIG. 3 to edit profile 252 of child gateway 214.

FIG. 3 illustrates fields 302-324 of profile 248 being editable via GUI 300. However, FIG. 3 should not be construed to require that any of profiles 248, 250, and 252 necessarily include any or all of fields 302-324, or that such fields are necessarily editable by a subscriber. Instead, the number and type of fields of a profile 248, 250, and 252 will be implementation dependent. For example, in an embodiment of child gateway 210 that does not support a wireless network, wireless communication fields 302-308 may be omitted from profile 248. As another example, in an embodiment of parent gateway 202 where child gateways 210, 212, and 214 share common wireless network hardware, it may not be feasible to individually configure wireless communication channels for each child gateway 210, 212, and 214, and fields 304-308 may therefore be omitted from profile 248. Furthermore, any of profiles 248, 250, and 252 could include fields other than, or in addition to, fields 302-324.

Fields 302-308 of GUI 300 relate to wireless communication network settings of child gateway 210 and associated LAN 216. In particular, field 302 specifies a service set identifier (SSID) configuration, field 304 specifies a wireless communication channel configuration, e.g., what channel(s) are used for wireless communication, field 306 specifies a channel width used for wireless communication, and field 308 specifies encryption used for wireless communication.

Fields 310-316 relate to security settings of child gateway 210 and associated LAN 216. Specifically, field 310 species access controls associated with child gateway 210 and LAN 216, such as for controlling access to LAN 216 according to time of day, type of access requested, type of application requesting access, data source address, data destination address, network operating conditions, etc. Field 312 specifies a user list associated with child gateway 210 and LAN 216, such as a "whitelist" of users authorized to access LAN 216 and/or a "blacklist" of users prohibited from accessing LAN 216. Field 314 specifies a device list associated with child gateway 210 and LAN 216, such as a whitelist of devices authorized to access LAN 216 and/or a blacklist of devices prohibited from accessing LAN 216. Field 316 specifies a firewall list associated with child gateway 210 and LAN 216, such as a list of open ports and/or a list of blocked ports.

Fields 318-324 relate to network settings of child gateway 210 and associated LAN 216. In particular, field 318 specifies a network timing protocol (NTP) setting associated with child gateway 210 and associated LAN 216, such as identity of a desired NTP server for use by the gateway and the LAN. Field 320 specifies dynamic host configuration protocol (DHCP) configuration for child gateway 210 and LAN 216, such as whether DHCP should be used, and if so, what IP address ranges should be used. Field 320 optionally also specifies any static IP addresses assigned to one or more clients of LAN 216. Field 322 specifies DNS configuration for child gateway 210 and LAN 216, such as identity of a DNS server to be used by the child gateway and LAN. Field 324 specifies Quality of Service (QoS) settings associated with child gateway 210 and associated LAN 216. For example, field 324 may be used to specify that one or more applications, devices, and/or services that are sensitive to latency receive higher priority communication service than other applications, devices, and/or services.

Referring again to FIG. 2, some embodiments of child gateways 210, 212, and 214 have different respective identities with respect to provider's network 204. For example, FIG. 2 illustrates child gateways 210, 212, and 214 as having respective identities ID_1, ID_2, and ID_3. Each identity ID_1, ID_2, and ID_3 includes, for example, a unique subscriber identifier, a unique media access control (MAC) address, and/or a unique IP address, such that each child gateway 210, 212, and 214 may be seen by provider's network 204 as a separate entity. Therefore, the communication service provider may be able to treat each child gateway 210, 212, and 214 differently, even though all child gateways 210, 212, and 214 are at a common location 208 and are served by a common communication link 206.

For example, in some embodiments, service provider's network 204 is configured to allocate a total bandwidth of communication link 206 among gateways 210, 212, and 214 in a predetermined manner. Table 1 below shows one example allocation of communication link bandwidth among child gateways 210, 212, and 214. In this example, child gateway 210 is provisioned 20 percent of a total bandwidth of communication link 206, child gateway 212 is provisioned 30 percent of the total bandwidth of communication link 206, and child gateway 214 is provisioned 50 percent of the total bandwidth of communication link 206. For instance, if communication link 206 has a total bandwidth 10 Gbps, child gateways 210, 212, and 214 would be allocated bandwidths of 2 Gbps, 3 Gbps, and 5 Gbps, respectively, under the Table 1 example.

TABLE 1

| Child Gateway | Percentage of Total Bandwidth |
| --- | --- |
| 210 | 20% |
| 212 | 30% |
| 214 | 50% |

In some applications, total bandwidth of communication link 206 may vary, such as based on load on provider's network 204. In these applications, bandwidth allocated to child gateways 210, 212, and 214 may be respective percentages of current total bandwidth. For example, assume a scenario where (1) nominal total bandwidth of communication link 206 is 10 Gbps, (2) current bandwidth of communication link 206 is 5 Gbps, and (3) provider's network 204 is configured to allocate bandwidth among child gateways 210, 212, and 214 according to Table 1 above. In this example scenario, child gateways 210, 212, and 214 would be allocated bandwidths of 1 Gbps, 1.5 Gbps, and 2.5 Gbps, respectively. Furthermore, in some embodiments, bandwidths allocated to child gateways 210, 212, and 214 are capped at predetermined maximum values, such as predetermined percentages of nominal total bandwidth of communication link 206. For example, assume a scenario where (1) nominal total bandwidth of communication link 206 is 10 Gbps. (2) current bandwidth of communication link 206 is 12 Gbps, (3) provider's network 204 is configured to allocate bandwidth among child gateways 210, 212, and 214 according to Table 1 above, and (4) bandwidths allocated to child gateways 210, 212, and 214 are capped at the percentages of Table 1 of the nominal total bandwidth of communication link 206. In this example scenario, child gateways 210, 212, and 214 would be allocated bandwidths of 2 Gbps, 3 Gbps, and 5 Gbps, respectively, even though communication link 206 is currently capable of providing additional bandwidth to each child gateway 210, 212, and 214.

In some embodiments, provider's network 204 is configured to individually assign data caps to child gateways 210, 212, and 214, where each data cap specifies a maximum amount of data the provider's network 204 will handle on behalf of each child gateway 210, 212, and 214 during a predetermined time period without the subscriber incurring a penalty, such as an extra charge or throttling of data transmission rate. For example, in one example scenario, provider's network 204 assigns child gateways 210, 212, and 214 data caps of 200 Gigabytes per month, 500 Gigabytes per month, and one Terabyte per month, respectively.

Additionally, in some embodiments of system 200, provider's network 204 is configured to individually provision services to child gateways 210, 212, and 214 and their associated LANs 216, 218, and 220. Examples of such services include, but are not limited to, one or more of security services, Internet of Things (IoT) device management services, data storage services, telephone services, entertainment services, low-latency data transmission services, secure data transmission services, etc.

Moreover, in particular embodiments, provider's network 204 is configured to map service flows to respective child gateways 210, 212, and 214. For example, assume a scenario where provider's network 204 is configured to support a limited amount of low latency traffic per subscriber's premises. In this scenario, provider's network 204 could optionally be configured to allocate a low latency traffic allowance among child gateways 210, 212, and 214, so that each LAN 216, 218, and 220 would have its own low latency traffic flow and associated buffer.

Discussed below are several possible advantages of communication system 200 relative to a conventional communication system which provides only a single network interface at a given subscriber's location. It is understood, however, that the following advantages are provided solely as examples, and not all embodiments of communication system 200 will necessarily achieve these advantageous.

Some embodiments of communication system 200 advantageously enable the communication service provider to have business relationships with multiple parties at subscriber's location 208. For instance, consider again the above example of Alice and Bob. The communication service provider may have separate business relationships with Alice and Bob, such that Alice and Bob can individually purchase services from the service provider according to their respective needs and desires. For example, Alice may be a "power user" and therefore subscribe to a platinum tier service plan offering 5 Gbps of bandwidth with low-latency data transfer service. Bob, on the other hand, my not need high bandwidth, and Bob may therefore subscribe to a bronze tier service plan offering 200 Mbps of bandwidth. Additionally, Alice may subscribe to a security service from the communication service provider while Bob subscribes to an IoT device management service from the service provider. Such ability of the service provider to have individual business relationships with multiple parties at subscriber's location 208 not only promotes subscriber satisfaction by enabling them to customize their services, but it may also enable the service provider to sell additional services to subscribers.

Additionally, the fact that parent gateway 202 supports multiple child gateways 210, 212, and 214 with their own respective profiles 248, 250, and 252 may enable greater network customization at subscriber's location 208 than could be realized with a conventional communication system. For instance, as discussed above with the example of Alice and Bob, in some embodiments, each child gateway 210, 212, and 214 and its associated LAN 216, 218, and 220 can be individually configured by editing profiles 248, 250, and 252, respectively. Accordingly, each LAN 216, 218, and 220 can be individually configured to meet the needs of its respective users, thereby furthering subscriber satisfaction. Additionally, presence of child gateways 210, 212, and 214 facilitates customizing network settings on a LAN basis. For example, in particular embodiments, child gateway 210 may be configured by profile 248 to automatically configure common DNS systems for all clients of private LAN 216.

Moreover, the fact that each LAN 216, 218, and 220 has a dedicated network interface via child gateways 210, 212, 214, respectively, promotes security by logically isolating data of one LAN 216, 218, or 220 from data of another LAN 216, 218, or 220 at subscriber's location 208. Additionally, in some embodiments, data of LANs 216, 218, and 220 is encrypted at points where it is transmitted via a common communication medium.

Discussed below with respect to FIGS. 4-9 are several example embodiments of communication system 200. It is understood, however, that communication system 200 is not limited to these example embodiments.

Figure 4:
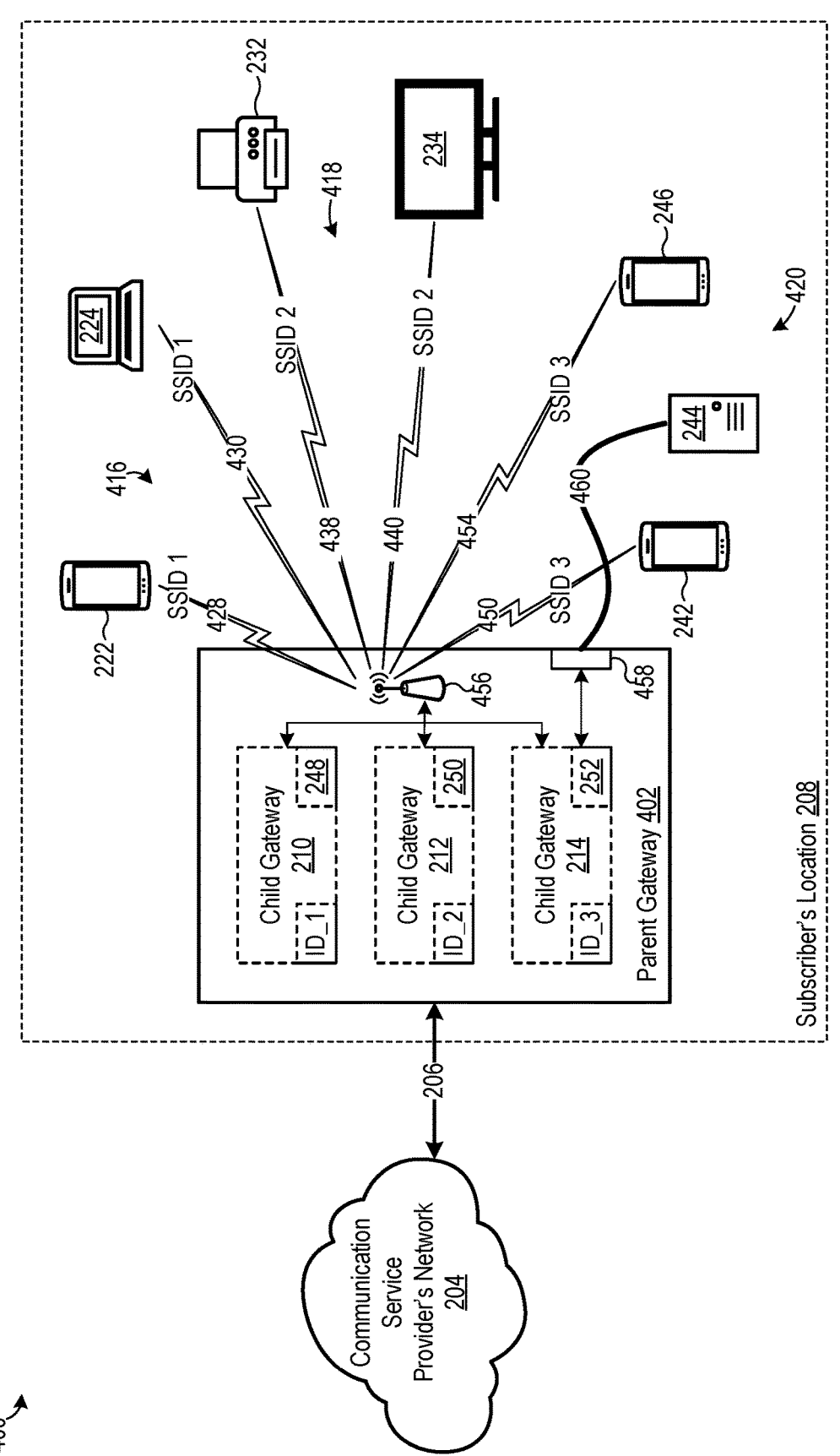
FIG. 4 is a block diagram of an embodiment of the FIG. 2 communication system including virtual local area networks.

FIG. 4 is a block diagram of a communication system 400, which is an embodiment of communication system 200 of FIG. 2 including virtual LANs. Communication system 400 includes a parent gateway 402, which is an embodiment of parent gateway 202. Parent gateway 402 includes a wireless access point 456 and a physical network port 458. Wireless access point 456 is shared by each of child gateways 210, 212, and 214, while physical network port 458 is dedicated to child gateway 214. In some embodiments, wireless access point 456 is a WiFi wireless access point. Communication network 400 includes a private LAN 416, a shared LAN 418, and a private LAN 420, which are embodiments of private LAN 216, shared LAN 218, and private LAN 220, respectively. Private LAN 416 communicatively couples clients 222 and 224 with child gateway 210 via wireless access point 456 and wireless communication signals 428 and 430. Shared LAN 418 communicatively couples clients 232 and 234 with child gateway 212 via wireless access point 456 wireless communication signals 438 and 440, respectively. LANs 416 and 418 share the same hardware, i.e., wireless access point 456, and LANs 416 and 418 are therefore virtual LANs. Each of virtual LANs 416 and 418 has a different SSID. Specifically, virtual LAN 416 has a SSID 1, and virtual LAN 418 has a SSID 2.

Private LAN 420, in contrast, is a hybrid virtual and physical LAN. Private LAN 420 communicatively couples clients 242 and 246 with child gateway 214 via wireless access point 456 and wireless communication signals 450 and 454. Private 420 has a SSID 3, which is different from SSID 1 and SSID 2 of LANs 416 and 418, respectively. Private LAN 420 shares wireless access point 456 with private LAN 416 and shared LAN 418, and private LAN 420 is therefore partially a virtual LAN. Private LAN 420 further includes physical network port 458 and a communication cable 460 which are dedicated to LAN 420, and private LAN 420 is therefore a hybrid virtual and physical LAN. Physical network port 458 provides a physical interface to child gateway 214, and communication cable 460 communicatively couples client 244 to physical network port 458. Physical network port 458 is, for example, an electrical Ethernet port or an optical Ethernet port, and communication cable 460 is, for example, an electrical Ethernet cable or an optical Ethernet cable.

Figure 5:
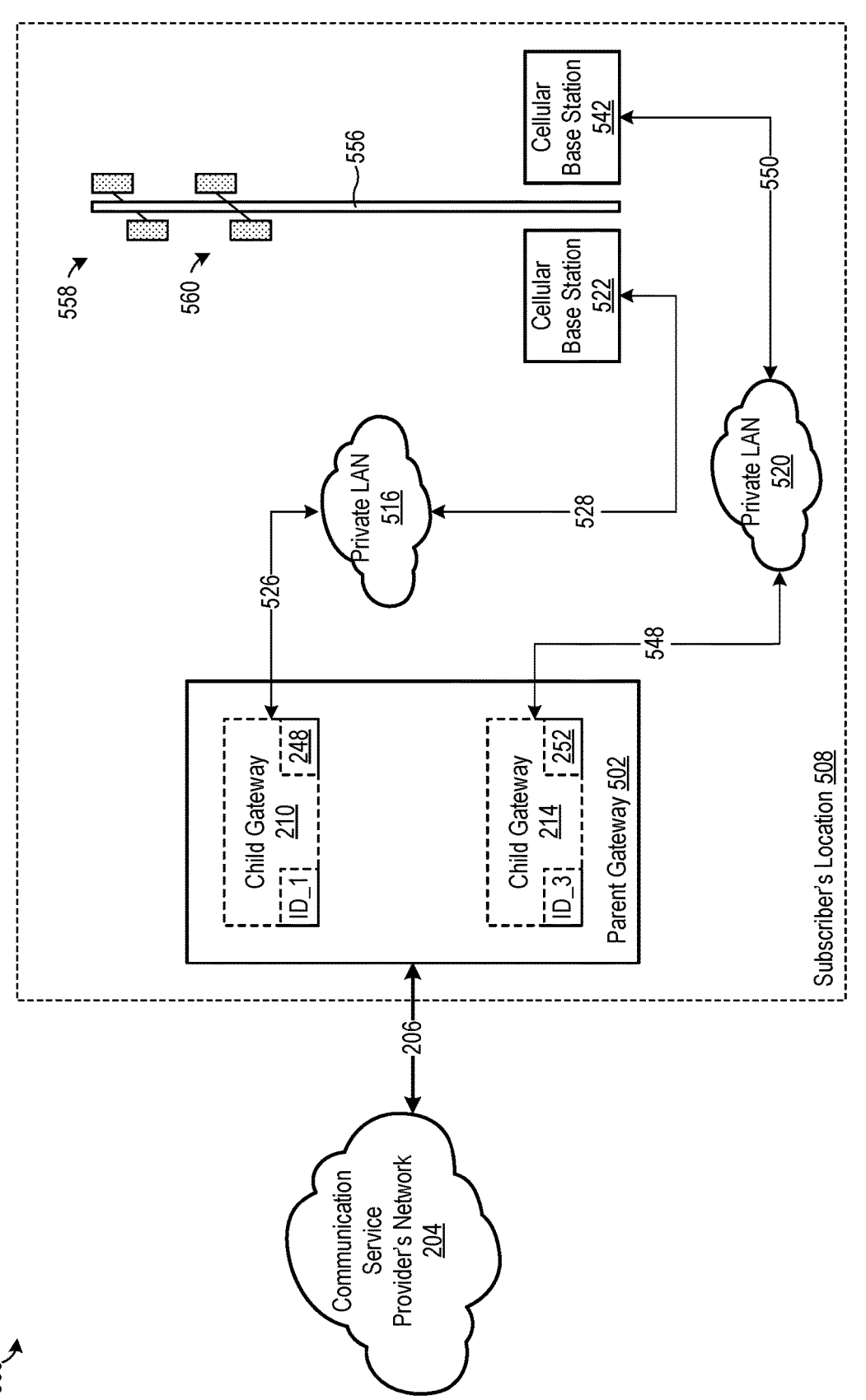
FIG. 5 is a block diagram of an embodiment of the FIG. 2 communication system where the subscriber's location is a cellular wireless communication base station site.

FIG. 5 is a block diagram of a communication system 500, which is an embodiment communication system of FIG. 2 where subscriber's location 208 is embodied by a subscriber's location 508 which is a cellular wireless communication base station site. Subscriber's location 508 includes a parent gateway 502, a private LAN 516, a private LAN 520, a cellular base station 522, a cellular base station 542, a communication tower 556, an antenna array 558, and an antenna array 560. Parent gateway 502 is an embodiment of parent gateway 202 (FIG. 2) which only supports two child gateways, i.e., child gateways 210 and 214. Private LAN 516 is an embodiment of private LAN 216 (FIG. 2), and private LAN 516 communicatively couples cellular base station 522 with child gateway 210 via logical communication links 526 and 528. Accordingly, cellular base station 522 is a client of private LAN 516. Private LAN 520 is an embodiment of private LAN 220 (FIG. 2), and private LAN 520 communicatively couples cellular base station 542 with child gateway 214 via logical communication links 548 and 550. Accordingly, cellular base station 542 is a client of private LAN 520. Each of antenna arrays 558 and 560 is mounted on communication tower 556. Cellular base station 522 is connected to antenna array 558 via an electrical cable (not shown), and cellular base station 542 is connected to antenna array 560 via an electrical cable (not shown). Accordingly, antenna array 558 supports cellular base station 522, and antenna array 560 supports cellular base station 542.

Communication system 500 advantageously enables the communication service provider to individually support each of cellular base stations 522 and 542, even though both cellular base stations are at a common location 508 that is served by a single communication link 206. For example, the service provider may be capable of provisioning each of cellular base stations 522 and 544 at different service levels. Cellular base stations 522 and 542 may be owned by different parties sharing communication tower 556, or cellular base stations 522 and 542 may be owned by a common party but support different respective cellular wireless communication networks, e.g., a fourth generation (4G) cellular wireless communication network and a 5G cellular wireless communication network.

Figure 6:
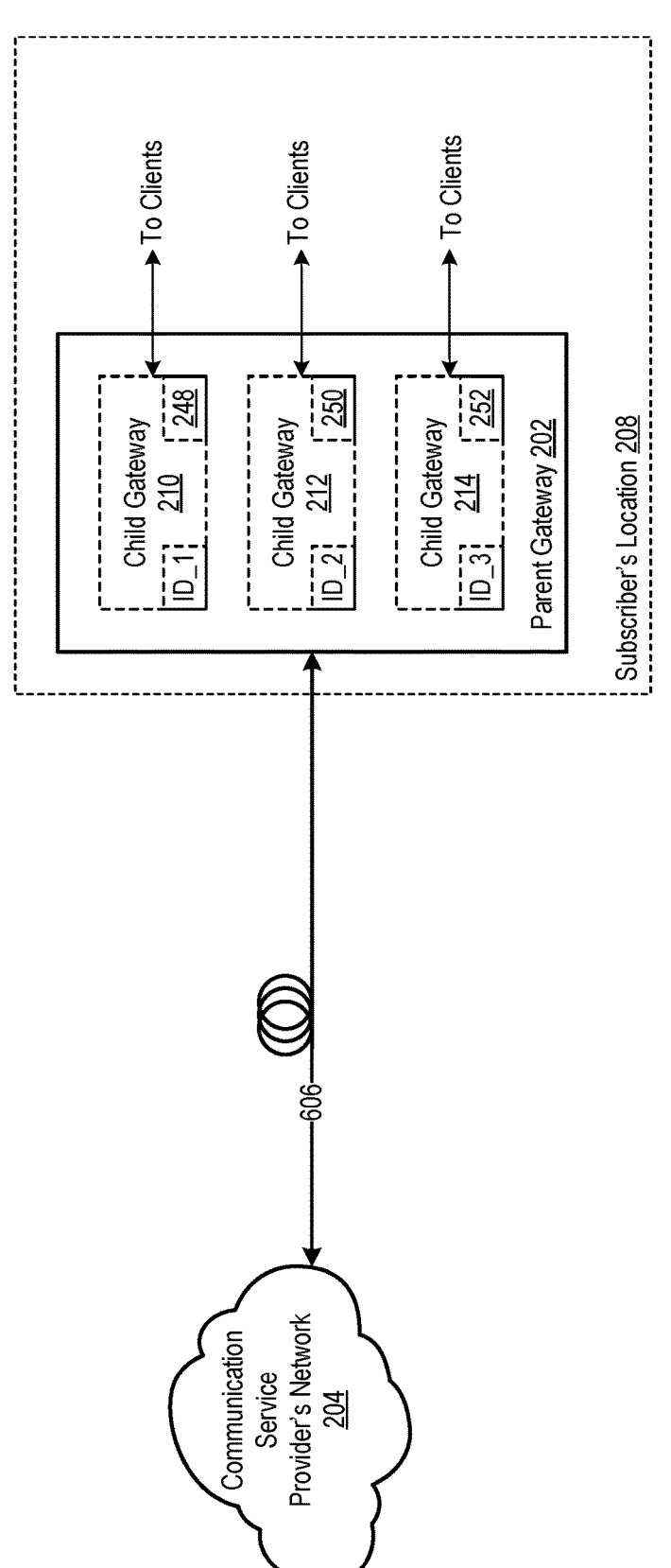
FIG. 6 is a block diagram of an embodiment of the FIG. 2 communication system where a communication link between a communication service provider's network and the subscriber's location is embodied by an optical cable.

FIG. 6 is a block diagram of a communication system 600, which is an embodiment of communication system 200 where communication link 206 is embodied by an optical cable. 606. LANs and clients at subscriber's location 208 are not shown in FIG. 6 for illustrative clarity. In some embodiments, data is transmitted between provider's network 204 and parent gateway 202 in accordance with an Ethernet passive optical network (EPON) protocol, a radio frequency of over glass (RFOG or RFoG) protocol, a Gigabit-capable passive optical network (GPON) protocol, and any variations, improvements, and/or evolutions thereof.

Figure 7:
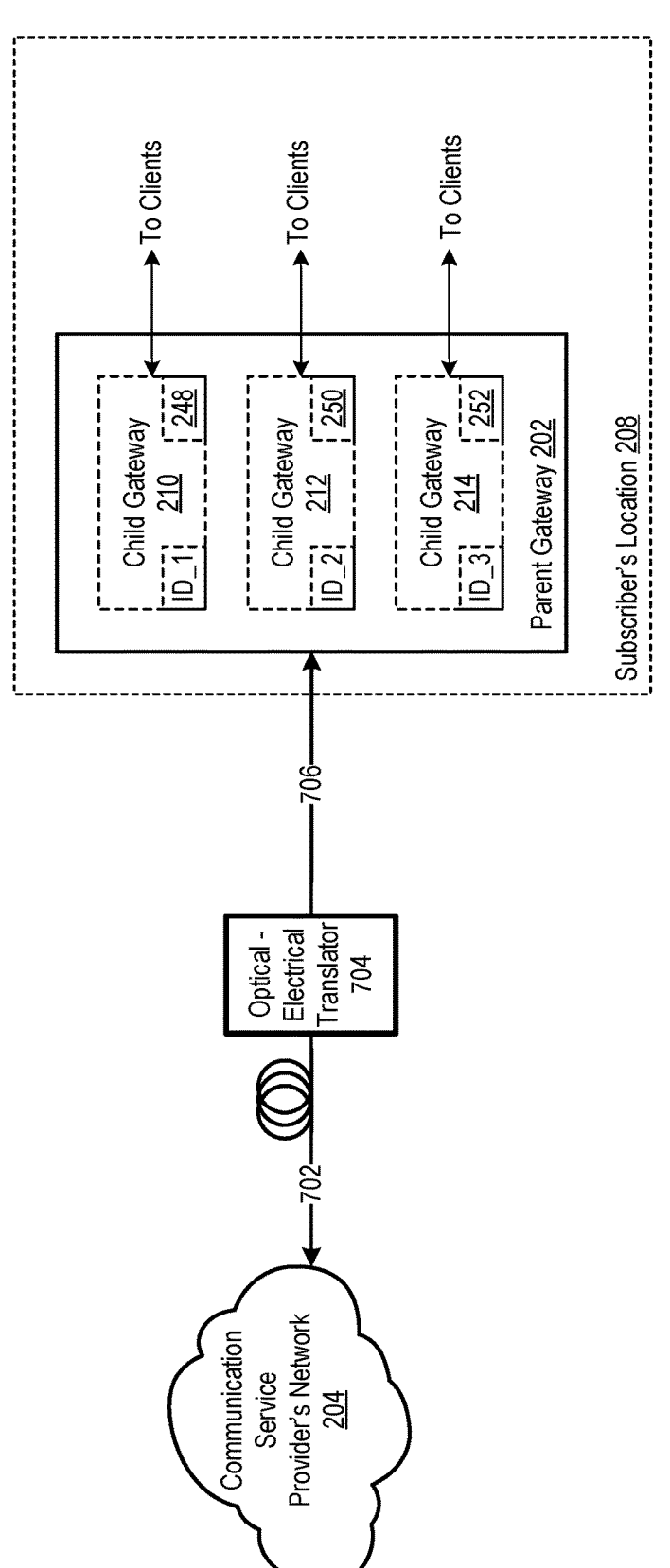
FIG. 7 is a block diagram of an embodiment of the FIG. 2 communication system where a communication link between a communication service provider's network and the subscriber's location is embodied by a hybrid optical-electrical communication link.

FIG. 7 is a block diagram of a communication system 700, which is an embodiment of communication system 200 where communication link 206 is embodied by the combination of an optical cable 702, an optical-electrical translator 704, and an electrical cable 706. LANs and clients at subscriber's location 208 are not shown in FIG. 7 for illustrative clarity. Optical-electrical translator 704 is configured to convert communication signals on optical cable 702 from the optical domain to the electrical domain for transmission by electrical cable 706, and vice versa. In some embodiments, electrical cable 706 is a coaxial electrical cable or a twisted pair electrical cable, and optical-electrical translator 704 is a fiber node or a remote terminal, respectively. In embodiments where electrical cable 706 is a coaxial electrical cable, data is optionally transmitted by the electrical cable according to a data over cable service interface specification (DOCSIS) protocol. In embodiments where electrical cable 706 is a twisted pair electrical cable, data is optionally transmitted by the electrical cable according to an Ethernet protocol or a digital subscriber line (DSL) protocol.

Figure 8:
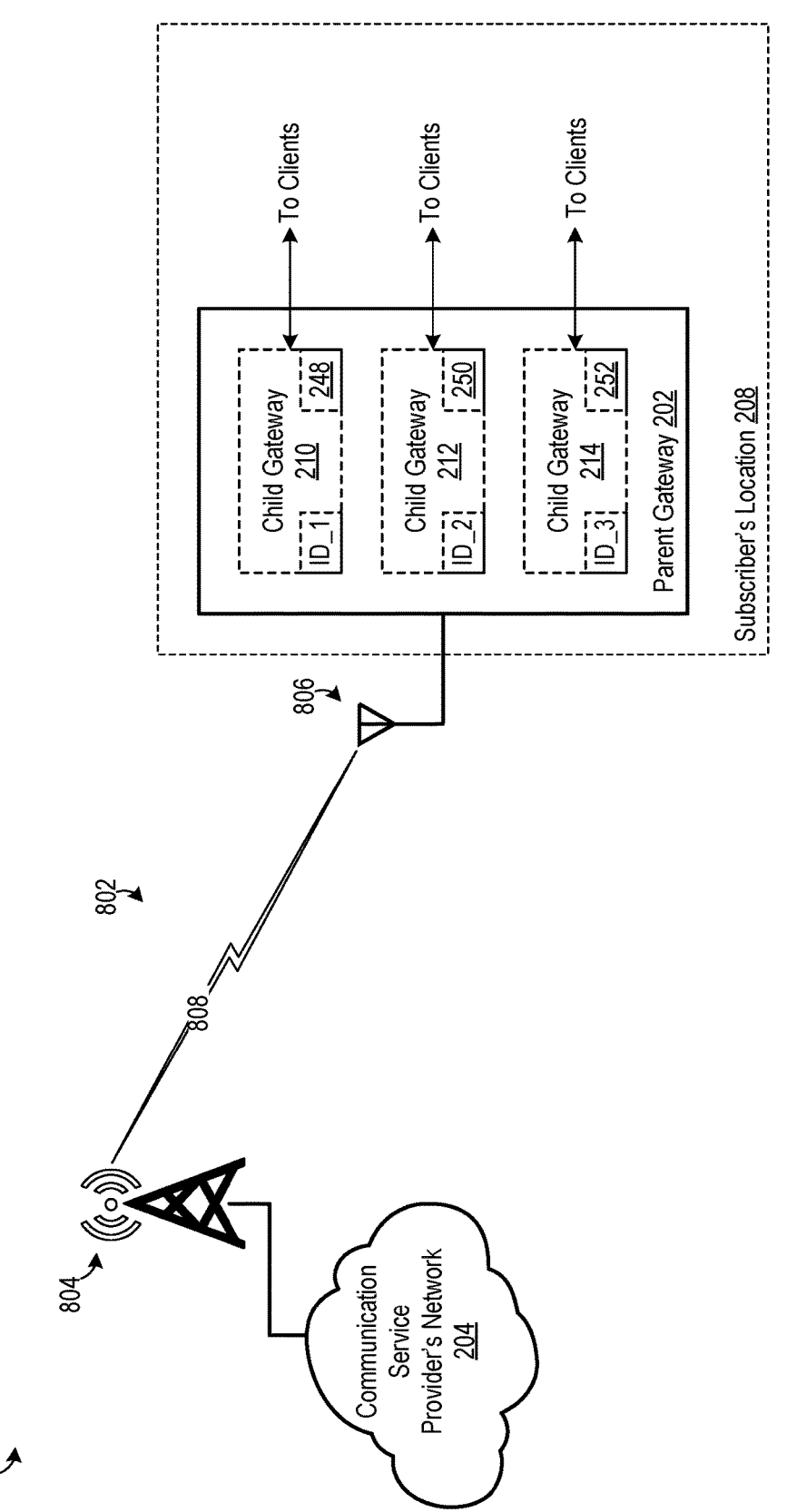
FIG. 8 is a block diagram of an embodiment of the FIG. 2 communication system where a communication link between a communication service provider's network and the subscriber's location is embodied by a fixed wireless communication link.

FIG. 8 is a block diagram of a communication system 800, which is an embodiment of communication system 200 where communication link 206 is embodied by a fixed wireless communication link 802. LANs and clients at subscriber's location 208 are not shown in FIG. 8 for illustrative clarity. Fixed wireless communication link 802 includes a RF transceiver 804 communicatively coupled to provider's network 204 and a RF transceiver 806 communicatively coupled to parent gateway 202. Data is transmitted between RF transceivers 804 and 806 via wireless communication signals 808.

Figure 9:
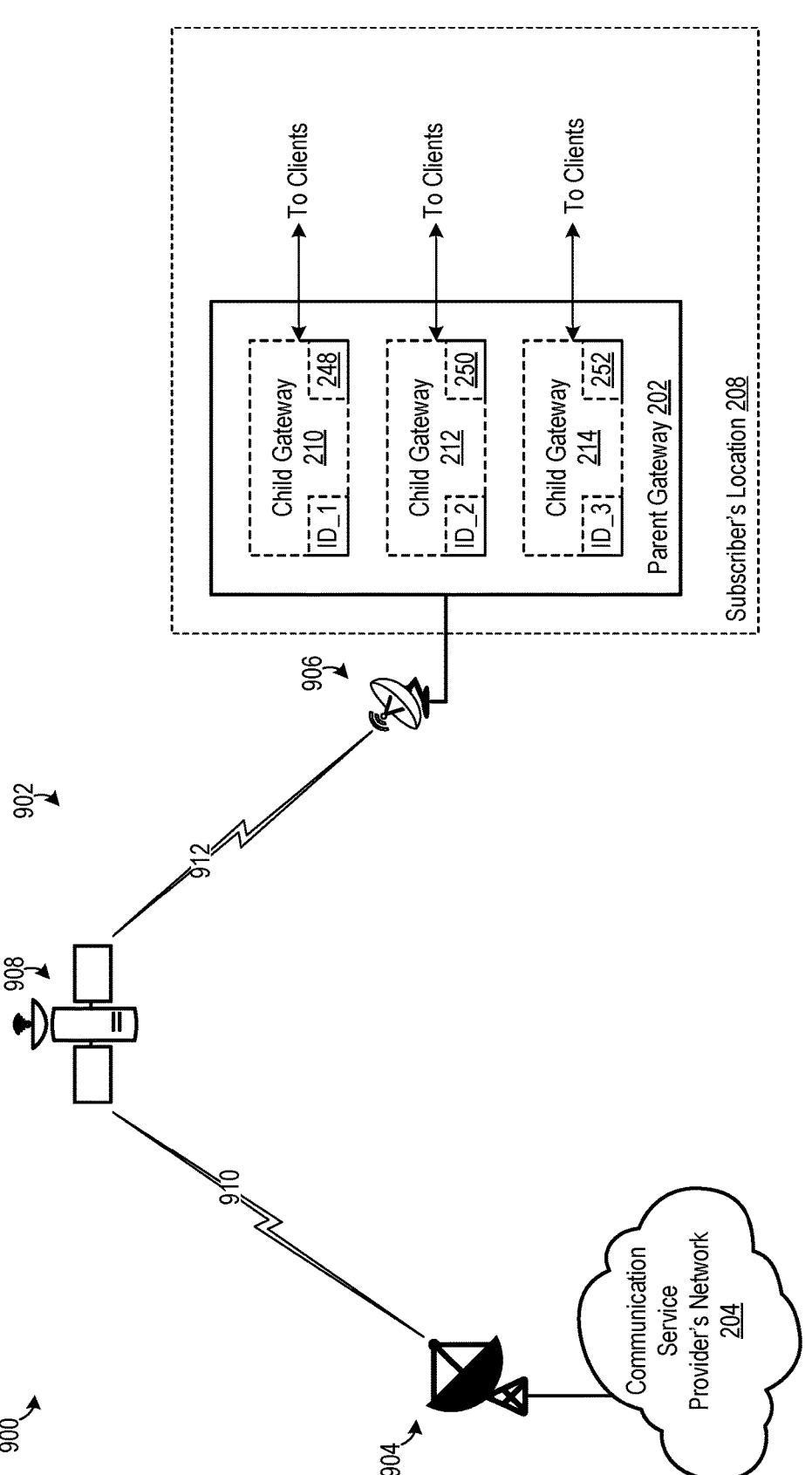
FIG. 9 is a block diagram of an embodiment of the FIG. 2 communication system where a communication link between a communication service provider's network and the subscriber's location is embodied by a satellite wireless communication link.

FIG. 9 is a block diagram of a communication system 900, which is an embodiment of communication system 200 where communication link 206 is embodied by a satellite wireless communication link 902. LANs and clients at subscriber's location 208 are not shown in FIG. 9 for illustrative clarity. Satellite wireless communication link 902 includes a satellite ground station 904 communicatively coupled to provider's network 204, a RF transceiver 906 communicatively coupled to parent gateway 202, and a satellite 908 in orbit above the earth. Data is transmitted between RF transceiver 904 and satellite 908 via wireless communication signals 910, and data is transmitted between satellite 908 and RF transceiver 906 via wireless communication signals 912. Thus, satellite 908 relays data between ground station 904 and RF transceiver 906. Satellite 908 is, for example, a low earth orbit (LEO) satellite, a medium each orbit (MEO) satellite, or a geostationary equatorial orbit (GEO) satellite.

Referring again to FIG. 2, in some embodiments, provider's network 204 is configured to send each child gateway 210, 212, and 214 a respective digital security certificate, e.g., a public key infrastructure (PKI) certificate or a X.509 certificate, that is signed by provider's network 204. Each digital security certificate is, for example, linked between provider's network and an identity of each child gateway, such as identities ID_1, ID_2, and ID_3 of the child gateways. Each child gateway 210, 212, and 214 uses its digital security certificate, for example, to establish secure communication sessions. Each child gateway 210, 212, and 214 may also use its digital security certificate to digital profile sign its respective profile 248, 250, and 252 before sending the profile to a communication service provider or another parent gateway (discussed below), to prove that the profile originated from the child gateway. Furthermore, some embodiments of child gateways 210, 212, and 214 are configured to act as an intermediary and use their digital security certificates to digitally sign end-entity security certificates for clients within its respective LAN 216, 218, and 220.

Figure 10:
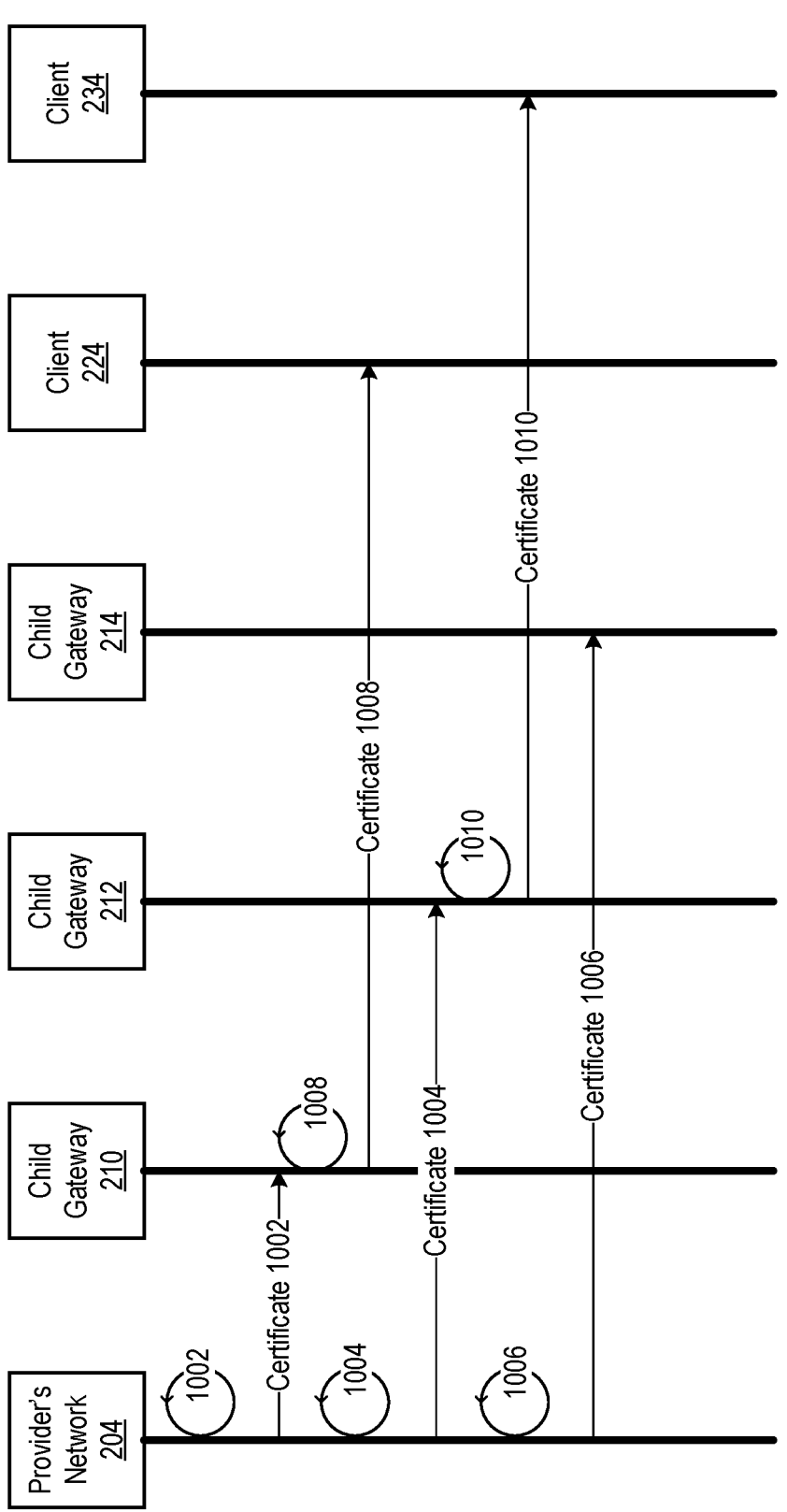
FIG. 10 is a dataflow diagram illustrating one example of digital security certificate provisioning in the FIG. 2 communication system, according to an embodiment.

FIG. 10 is a dataflow diagram illustrating one example of digital security certificate provisioning in communication system 200. FIG. 10 includes a respective vertical line logically representing each of provider's network 204, child gateway 210, child gateway 212, child gateway 214, client 224, and client 234. Provider's network 204 digitally signs each of digital security certificates 1002, 1004, and 1006, as represented by respective circular arrows, and provider's network 204 sends digital security certificates 1002, 1004, and 1006 to child gateways 210, 212, and 214, respectively. Child gateway 210 acts as an intermediary and uses digital security certificate 1002 to digitally sign an end-entity digital security certificate 1008 for client 224, and child gateway 210 sends digital security certificate 1008 to client 224. Additionally, child gateway 212 acts as an intermediary and uses digital security certificate 1004 to digitally sign an end-entity digital security certificate 1010 for client 234, and child gateway 212 sends digital security certificate 1010 to client 234.

Referring again in FIG. 2, in some embodiments, child gateways 210, 212, and 214 are configured to send their respective profiles 248, 250, and 252 to other parent gateways to establish temporary or permanent service for their respective subscribers at other locations. Child gateways 210, 212, and 214 are optionally configured to digitally sign and/or encrypt their respective profiles 248, 250, and 252 before sending them outside of parent gateway 202, to help ensure security and integrity of the profiles.

As one example of establishing temporary service at a new location, assume that Alice of the example above is temporarily traveling to a vacation destination. Child gateway 210 (associated with Alice) may send profile 248 to a parent gateway at the vacation destination, such as a parent gateway of a hotel, via provider's network 204 and possibly one or more additional provider networks. The parent gateway at the destination location may then use profile 248 to establish a temporary child gateway for Alice that is similar to, or even identical to, Alice's child gateway 210 at her home location 208. Consequently, Alice's communication network experience at the vacation destination may be similar to, or even identical to, her communication network experience at her home location 208. For example, network settings and available network services may be the same for Alice at the vacation destination as at her home location 208. The temporary child gateway at the vacation destination may be torn down when Alice departs the vacation destination.

As an example of establishing permanent service at a new location, assume that Bob of the example above is permanently moving from location 208 to a new home. Child gateway 214 may send profile 252 to a parent gateway at the new home, and the parent gateway may use profile 252 establish a new child gateway that is similar or identical to child gateway 214. For example, Bob's child gateway at his new home may have the same settings and provisioned services as child gateway 214 at location 208.

Figure 11:
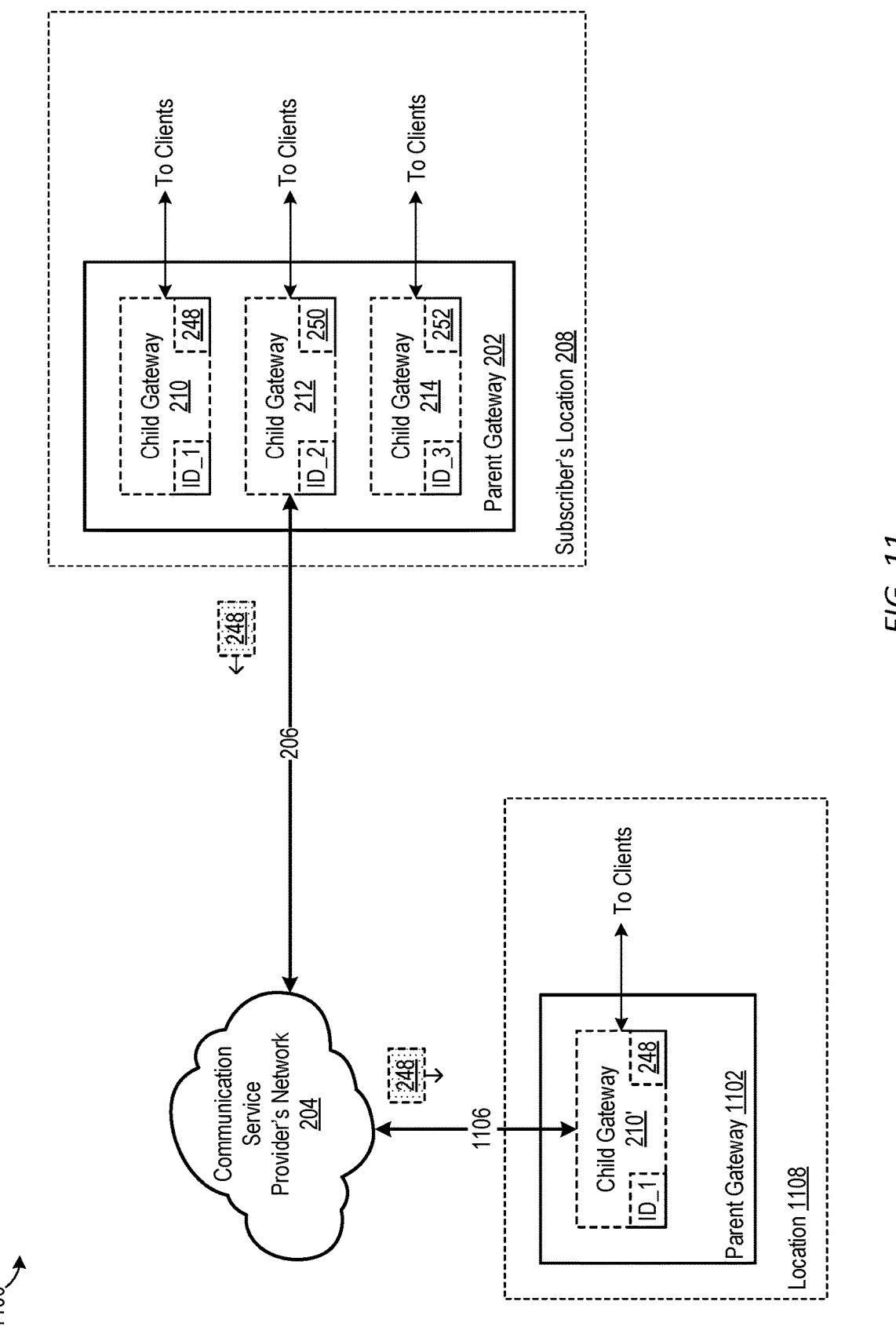
FIG. 11 is a block diagram of a communication system illustrating a profile being sent to another parent gateway, according to an embodiment.

FIG. 11 is a block diagram of a communication system 1100, which illustrates one example of a profile being sent to another parent gateway for establishing a new child gateway. Communication system 1100 is like communication system 200 of FIG. 2 but further including another parent gateway 1102 at a second location 1108. Parent gateway 1102 is communicatively coupled with provider's network 204 via a communication link 1106. LANs and clients at locations 208 and 1108 are not shown in FIG. 11 for illustrative clarity. FIG. 11 assumes that Alice desires a clone of child gateway 210 at second location 1108, such as to serve Alice while she is at location 1108 for vacation. Child gateway 210 accordingly encrypts and digitally signs profile 248, and child gateway 210 sends profile 248 to parent gateway 1102 via communication link 206, provider's network 204, and communication link 1106. Profile 248 is illustrated in FIG. 11 as being shaded while in transit between parent gateway 202 and parent gateway 1102, to represent that the profile is encrypted during transit. Parent gateway 1102 then decrypts and confirms authenticity of profile 248, and parent gateway 1102 subsequently establishes a child gateway 210' at location 1108, when child gateway 210' at location 1108 is a clone of child gateway 210 at location 208. While FIG. 11 illustrates child gateways 210 and 210' as having a common identity ID_1, in some embodiments, their identities may differ, such as in applications where provider's network 204 requires the two child gateways to have different identities.

Figure 12:
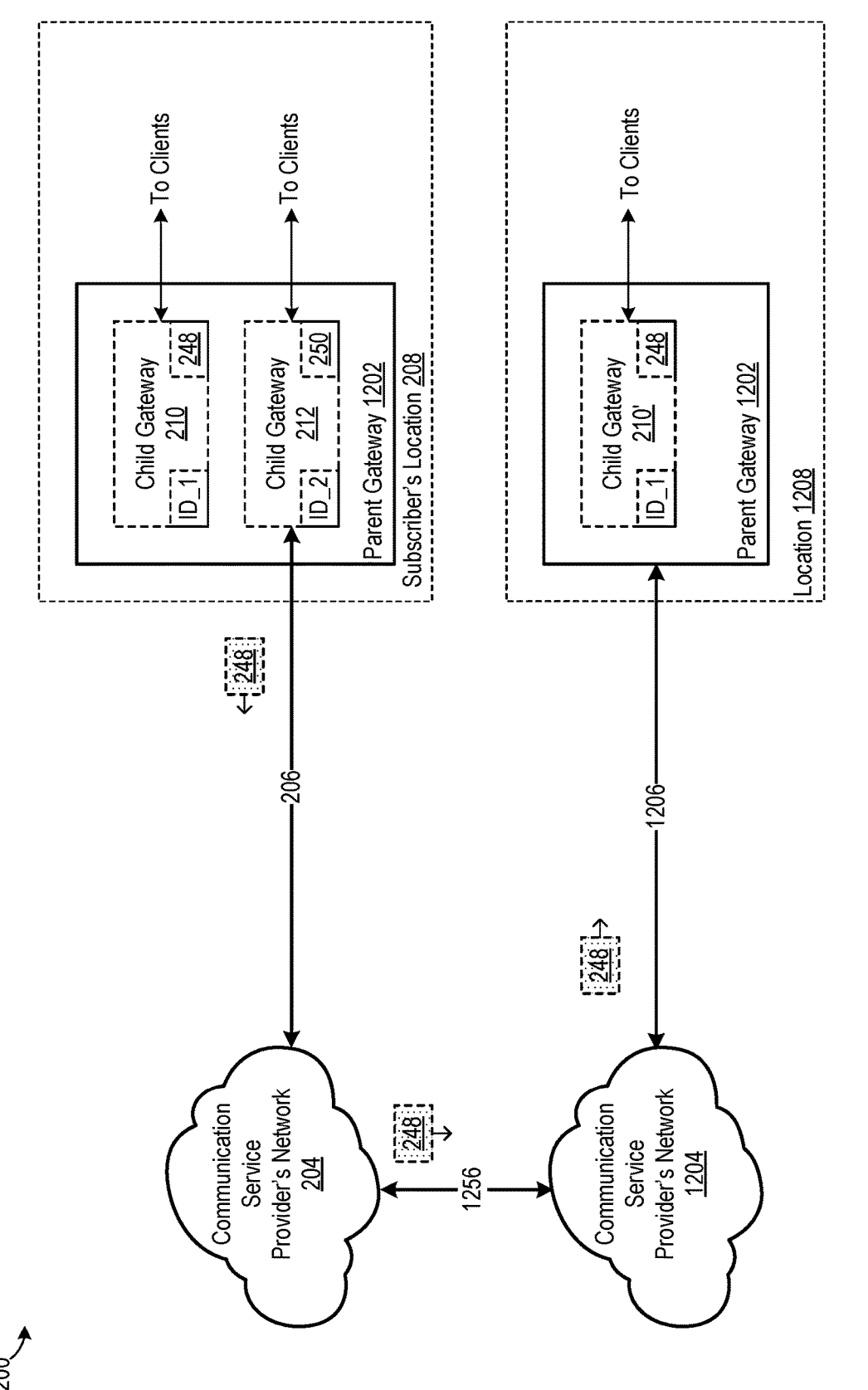
FIG. 12 is a block diagram of another communication system illustrating a profile being sent to another parent gateway, according to an embodiment.

FIG. 12 is a block diagram of a communication system 1200, which illustrates another example of a profile being sent to another parent gateway for establishing a new child gateway. Communication system 1200 is like communication system 200 of FIG. 2 but further includes (1) another provider's network 1204 and (2) another parent gateway 1202 at a second location 1208. An operator of provider's network 1204 may have a business relationship with the operator of provider's network 204. Provider's networks 204 and 1204 are communicatively coupled via a communication link 1256, which may be the Internet. Parent gateway 1202 is communicatively coupled with provider's network 1204 via a communication link 1206. LANs and clients at locations 208 and 1208 are not shown in FIG. 12 for illustrative clarity.

FIG. 12 assumes that Alice desires a clone of child gateway 210 at second location 1208, such as to serve Alice while she is at location 1208 for vacation. Child gateway 210 accordingly encrypts and digitally signs profile 248, and child gateway 210 sends profile 248 to parent gateway 1202 via communication link 206, provider's network 204, communication link 1256, provider's network 1204, and communication link 1206. Profile 248 is illustrated in FIG. 12 as being shaded while in transit between parent gateway 202 and parent gateway 1202, to represent that the profile is encrypted during transit. Parent gateway 1202 then decrypts and confirms authenticity of profile 248, and parent gateway 1202 subsequently establishes a child gateway 210' at location 1208, when child gateway 210' at location 1208 is a clone of child gateway 210 at location 208. While FIG. 12 illustrates child gateways 210 and 210' as having a common identity ID_1, in some embodiments, their identities may differ, such as in applications where provider's network 1204 requires a different form of identity than provider's network 204.

Figure 13:
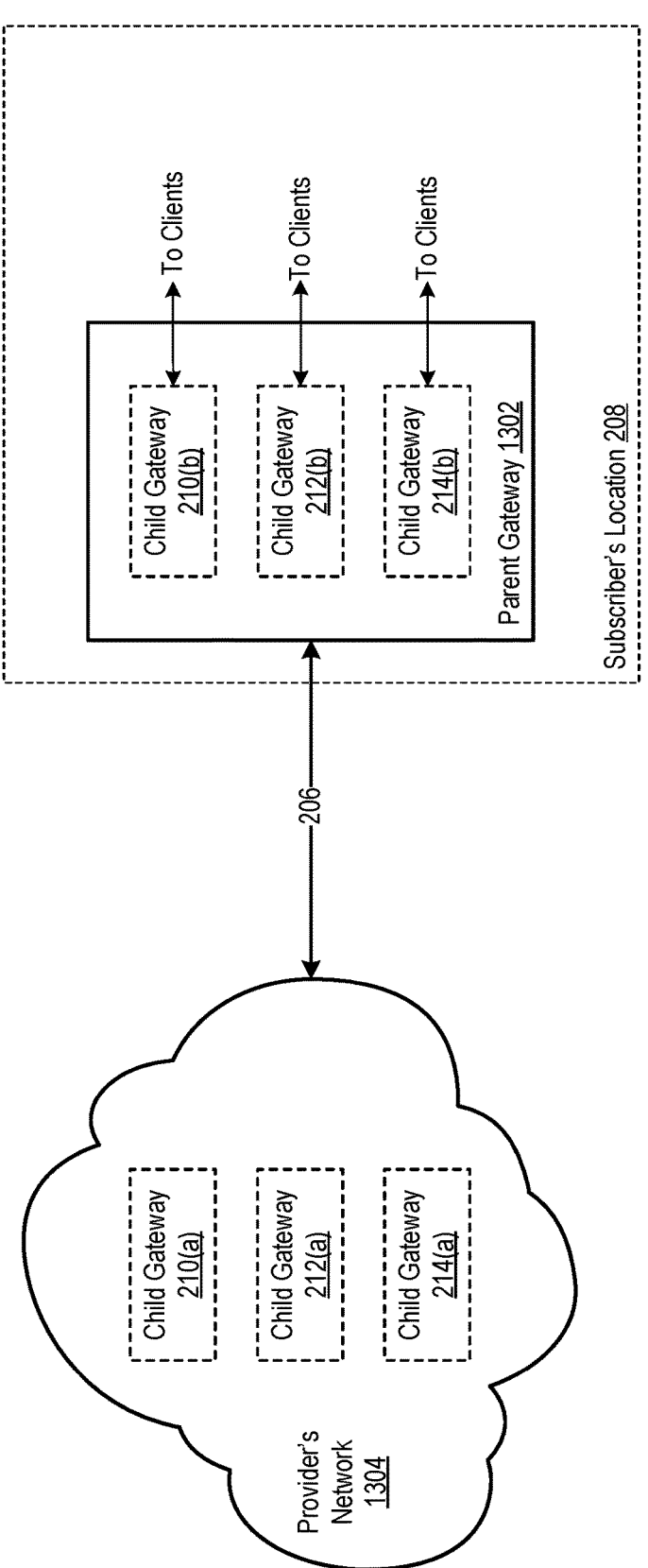
FIG. 13 is a block diagram of an alternate embodiment of the FIG. 2 communication system where child gateways are distributed between a parent gateway and a communication service provider's network.

Referring again to FIG. 2, communication system 200 could be modified so that one or more child gateways 210, 212, and 214 are virtual child gateways that are partially implemented outside of parent gateway 202. For example, FIG. 13 is a block diagram of a communication system 1300, which is an alternate embodiment of communication system 200 of FIG. 2 where parent gateway 1202 is replaced with parent gateway 1302 and provider's network 204 is replaced with provider's network 1304. Child gateways 210, 212, and 214 are virtual gateways that are distributed between provider's network 1304 and parent gateway 1302. Specifically, child gateway 210 is split between a first portion 210 (*a*) in provider's network 1304 and a second portion 210 (*b*) in parent gateway 1302. Similarly, child gateway 212 is split between a first portion 212 (*a*) in provider's network 1304 and a second portion 212 (*b*) in parent gateway 1302, and child gateway 214 is split between a first portion 214 (*a*) in provider's network 1304 and a second portion 214 (*b*) in parent gateway 1302.

Figure 14:
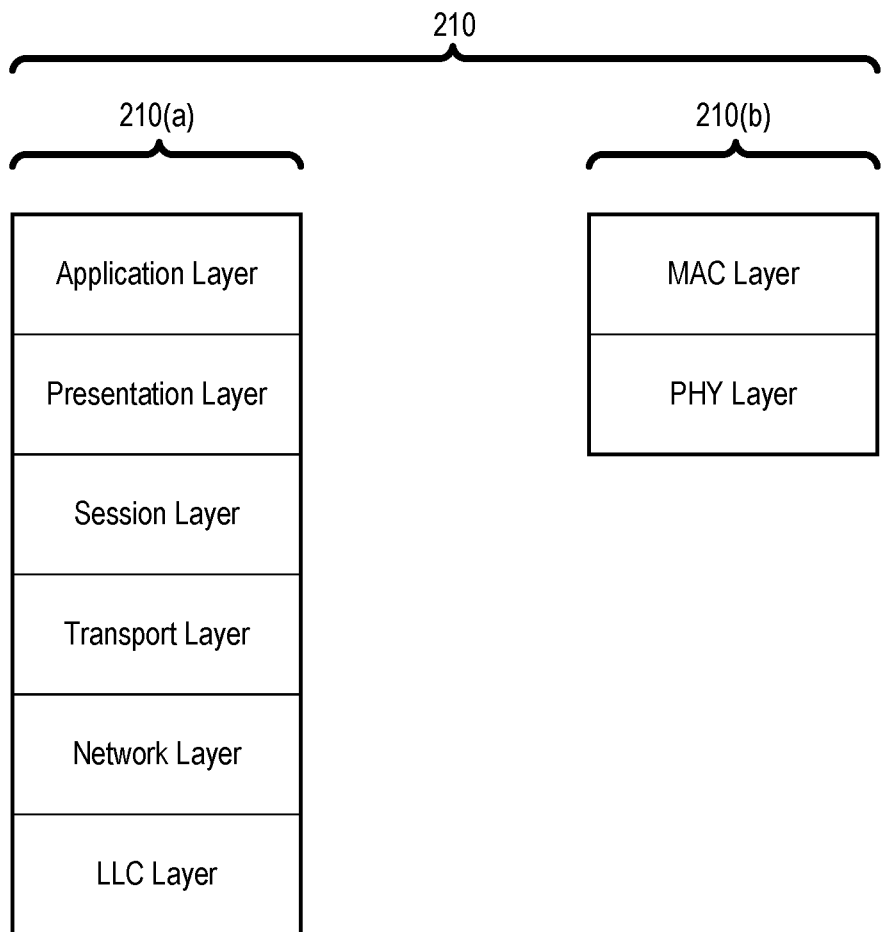
FIG. 14 is a block diagram illustrating one possible split of an open systems interconnection (OSI) model layer stack between first and second portions of a child gateway of the FIG. 13 communication system.

In some embodiments, first and second portions of child gateways 210, 212, 214 are split according to an open systems interconnection (OSI) model, where upper levels of an OSI model layer stack are implemented by first portions of the child gateways and lower levels of the OSI model layer stack are implemented by second portions of the child gateways. For example, FIG. 14 is a block diagram illustrating one possible split of OSI model layer stack levels between first and second portions 210 (*a*) and 210 (*b*) of child gateway 210. In this example split, (1) portion 210 (*a*) in provider's network 1304 implements an application layer, a presentation layer, a session layer, a transport layer, a network layer, and a logical link control (LLC) layer, and (2) portion 210 (*b*) in parent gateway 1302 implements a medium access control (MAC) layer and a physical (PHY) laser. In some embodiments, the MAC layer includes two MAC sublayers split between first portion 210 (*a*) and second portion 210 (*b*). It is understood that the split between first and second portions of child gateways 210, 212, and 214 is not limited to the example of FIG. 14 and that actual split between the two child portions is implementation dependent.

Figure 15:
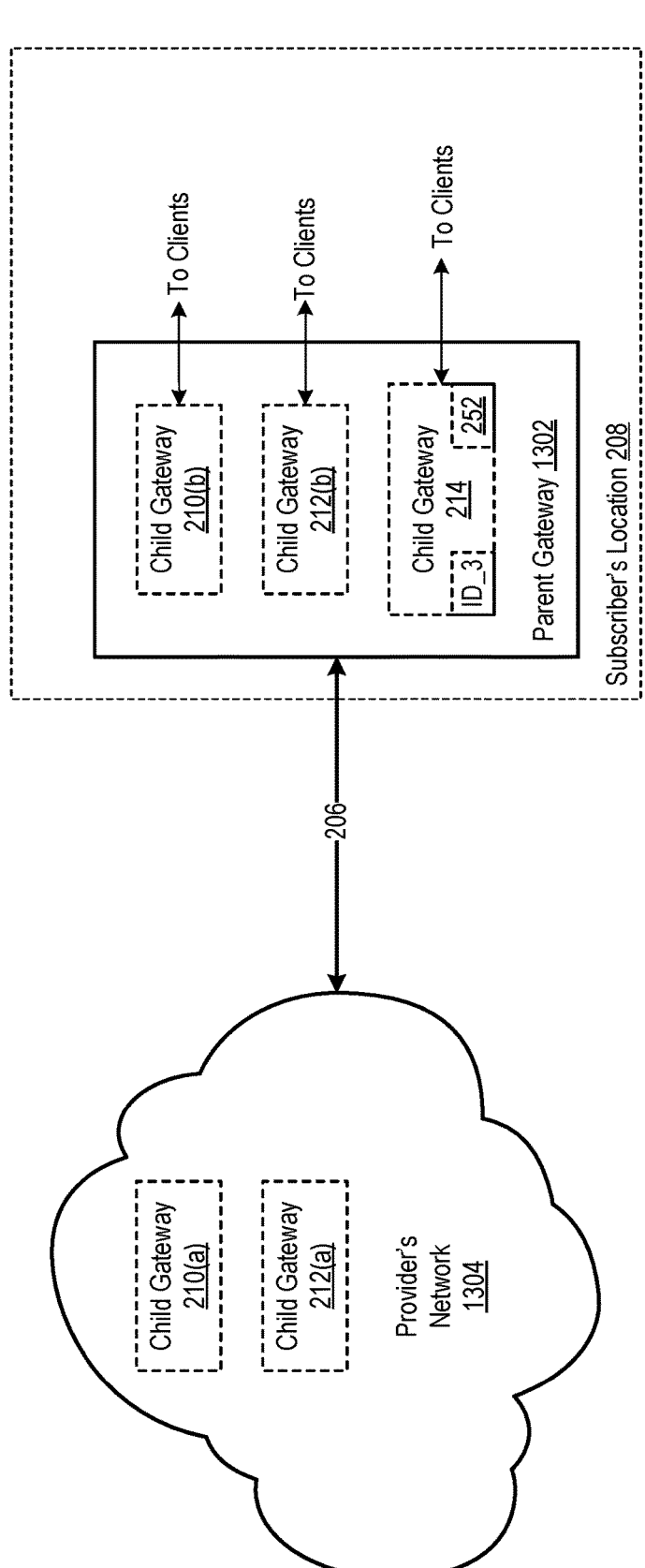
FIG. 15 is a block diagram of an alternate embodiment of the FIG. 13 communication system where one child gateway is completely implemented in the parent gateway and other child gateways are distributed between the parent gateway and the communication service provider's network.

Referring again to FIG. 13, communication system 1300 could be modified so that some child gateways are split between provider's network 1304 and parent gateway 1302 while other child gateways are completely implemented in parent gateway 1302. For example, FIG. 15 is a block diagram of a communication system 1500, which is an alternate embodiment of communication system 1300 of FIG. 13 where child gateway 214 is completely implemented in parent gateway 1302 instead of being split between provider's network 1304 and parent gateway 1302.

Splitting a child gateway between provider's network 1304 and parent gateway 1302 advantageously reduces processing requirements of parent gateway 1302 and splitting may reduce (or eliminate) need for a subscriber to configure the child gateway. However, splitting a child gateway between provider's network 1304 and parent gateway 1302 may increase latency of the child gateway, compared to implementing the child gateway completely in parent gateway 1302. Therefore, some embodiments of communication system 1500 are configured to dynamically change child gateways 210, 212, and 214 between being completely implemented in parent gateway 1302 and being split between the parent gateway and provider's network 1304.

For example, assume a scenario where child gateway 214 requires low latency while child gateway 212 is not latency sensitive. Communication system 1500 could be configured to automatically implement child gateway 214 in parent gateway 1302 to minimize its latency, while automatically splitting child gateway 212 between provider's network 1304 and parent gateway 1302 to minimize processing requirements of parent gateway 1302. As another example, communication system 1500 could be configured to determine whether to split a child gateway between provider's network 1304 and parent gateway 1302 based at least partially on processing load of parent gateway 1302. For example, communication system 1500 could be configured to implement a child gateway completely in parent gateway 1302 in response to a processing load of parent gateway 1302 being below a threshold value, and communication system 1500 could be configured to split the child gateway between provider's network 1304 and parent gateway 1302 in response to the processing load of parent gateway 1302 being greater than or equal to a threshold value.

Figure 16:
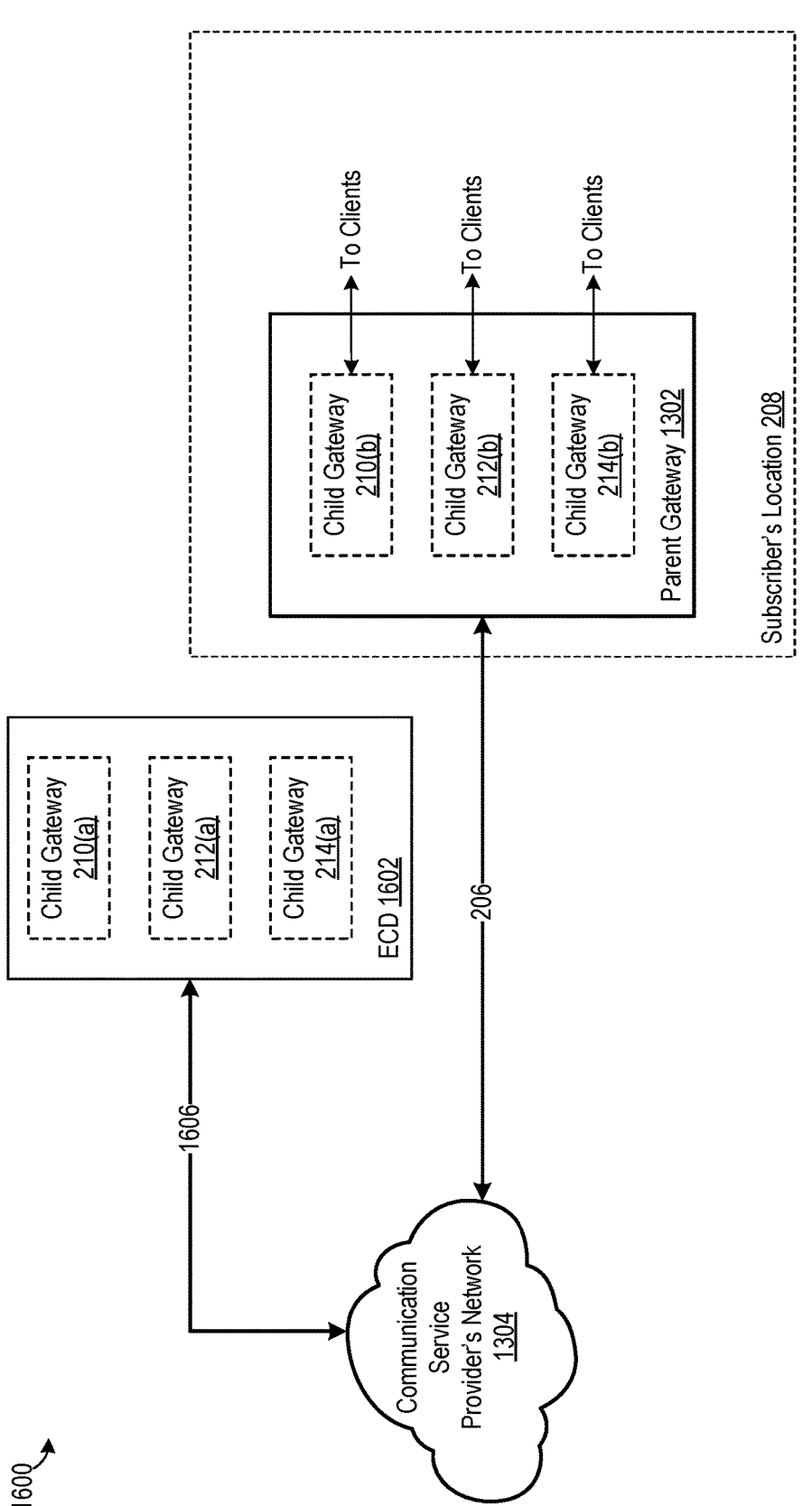
FIG. 16 is a block diagram of an alternate embodiment of the FIG. 13 communication system where child gateways are distributed between a parent gateway and an edge computing device.

Child gateways 210, 212, and 214 could also be split between three or more different computing elements, or between a parent gateway and a computing element other than a communication provider's network. For example, FIG. 16 is a block diagram of a communication system 1600, which is an alternate embodiment of communication system 1300 of FIG. 13 further including an edge computing device (ECD) 1602 communicatively coupled to provider's network 1304 by a communication link 1606. Edge computing device 1602 could be operated by the communication service provider of provider's network 1304, or edge computing device 1602 could be operated by a third party. First portions 210 (*a*), 212 (*a*), and 214 (*a*) of child gateways 210, 212, and 214 are implemented by edge computing device 1602, instead of being implemented by provider's network 1304. Edge computing device 1602 is relatively physically close to subscriber's location 208, and implementing first portions 210 (*a*), 212 (*a*), and 214 (*a*) in edge computing device 1602 (instead of in provider's network 1304) may advantageously reduce latency associated with child gateways 210, 212, and 214.

Figure 17:
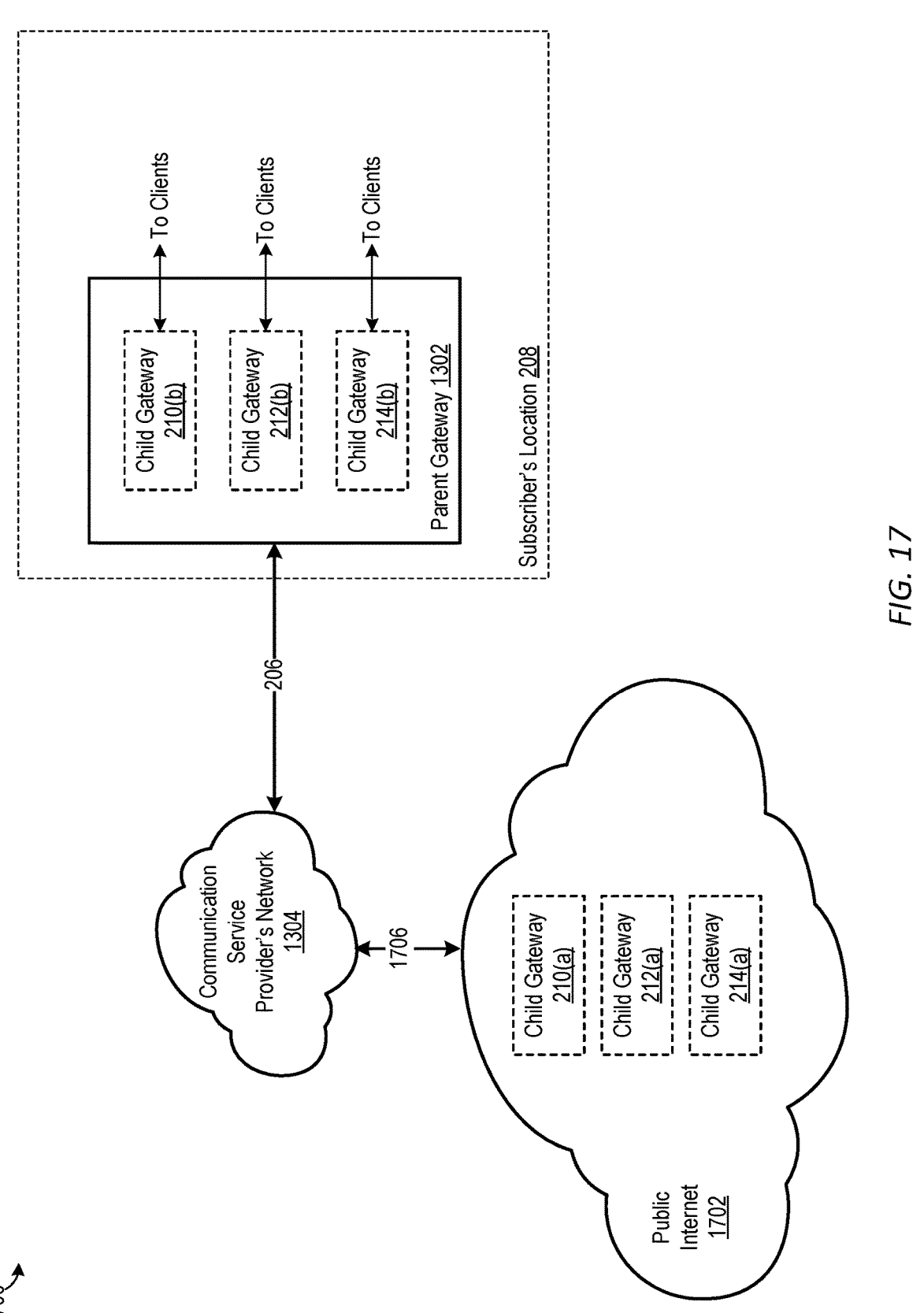
FIG. 17 is a block diagram of an alternate embodiment of the FIG. 13 communication system where child gateways are distributed between a parent gateway and the public Internet.

As another example, FIG. 17 is a block diagram of a communication system 1700, which is an alternate embodiment of communication system 1300 of FIG. 13, where first portions 210 (*a*), 212 (*a*), and 214 (*a*) of child gateways 210, 212, and 214 are implemented in the public Internet 1702, instead of being implemented in provider's network 1304. Provider's network 1304 is communicatively coupled to the public Internet 1702 by a communication link 1706. In some embodiments, child gateways 210, 212, 214 may be provisioned and/or accessed from the public Internet 1702, such as by a party selling parent gateway 1302 or by a party configuring or maintaining a LAN at subscriber's location 208. Additionally or alternately, child gateways 210, 212, and 214 may provisioned and/or accessed by the communication service provider operating provider's network 1304.

Figure 18:
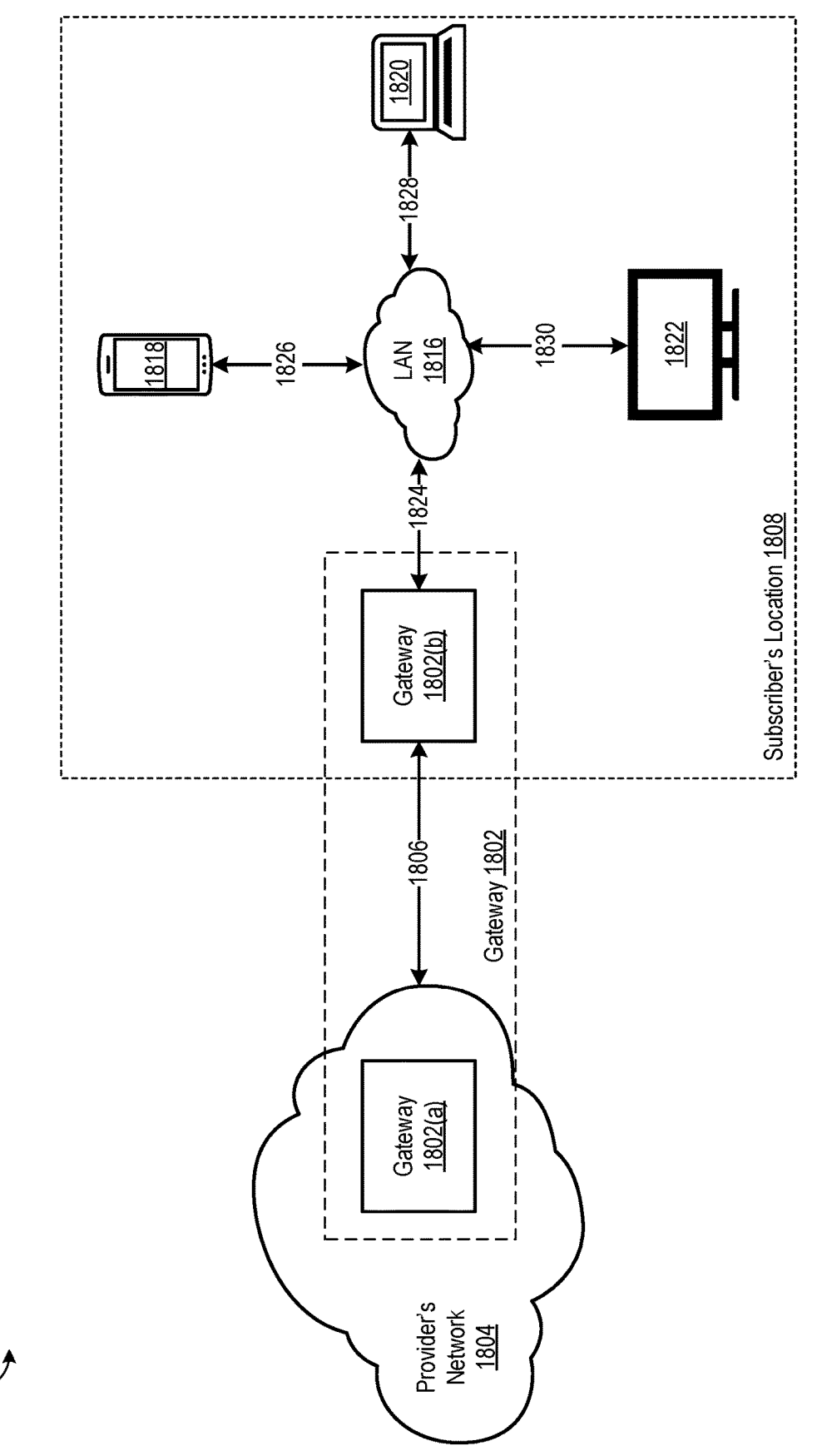
FIG. 18 is a block diagram of a communication system configured to support a single network interface where a gateway is distributed between a communication service provider's network and a subscriber's location, according to an embodiment.

The concept of splitting a gateway between a provider's network and a subscriber's location is not limited to parent gateways supporting multiple child gateways. Instead, the concept can also be applied to a gateway or modem supporting a single communication interface. For example, FIG. 18 is a block diagram of a communication system 1800 including a gateway 1802, a communication service provider's network 1804, and a communication link 1806. Provider's network 1804 is analogous to provider's network 204 of FIG. 2, and subscriber's location 1808 is analogous to subscriber's location 208 of FIG. 2. Gateway 1802 includes a first portion 1802 (*a*) in provider's network 1804 and a second portion 1802 (*b*) in subscriber's location 1808. Communication link 1806, which is analogous to communication link 206 of FIG. 2, communicatively couples second portion 1802 (*b*) of gateway 1802 with provider's network 1804. Gateway 1802 is configured to communicatively couple a LAN 1816 with provider's network 1804, and in some embodiments, gateway 1802 functions as a modem (e.g., a cable modem, a digital subscriber line modem, a wireless modem, etc.) or an ONT. LAN 1816 is configured to communicatively couple clients 1818, 1820, and 1822 with gateway 1802 via logical communication links 1824, 1826, 1828, and 1830. The number and configuration of clients served by LAN 1816 may vary without departing from the scope hereof. Additionally, although LAN 1816 is depicted as having a star configuration, LAN 1816 can have essentially any configuration as long as it is capable of communicatively coupling clients with gateway 1802.

In some embodiments, first portion 1802 (*a*) and second portion 1802 (*b*) of gateway 1802 are split according to an OSI model, where upper levels of an OSI model layer stack are implemented by first portion 1802 (*a*) and lower levels of the OSI model layer stack are implemented by second portion 1802 (*b*). For example, some embodiments are split in a manner similar to that illustrated in FIG. 14 where (1) first portion 1802 (*a*) includes an application layer, a presentation layer, a session layer, a transport layer, a network layer, and an LLC layer and (2) second portion 1802 (*b*) includes a MAC layer and a PHY layer. Additionally, the MAC layer could be split into first and second sublayers, where the first MAC sublayer is implemented in first portion 1802 (*a*) and the second MAC sublayer is implemented in second portion 1802 (*b*). Furthermore, communication system 1800 could be modified such that first portion 1802 (*a*) of gateway 1802 is implemented by a computing element other than provider's network 1804, such as in an edge computing device similar to edge computing device 1602 of FIG. 16 or in the public Internet in a manner similar to that illustrated in FIG. 17. In some embodiments, gateway 1802 may be provisioned and/or accessed from the public Internet, such as by a party selling gateway 1802 or by a party configuring or maintaining a LAN at subscriber's location 1808. Additionally or alternately, gateway 1802 may provisioned and/or accessed by the communication service provider operating provider's network 1804.

Features described above may be combined in various ways without departing from the scope hereof. The following examples illustrate some possible combinations.

(A1) A method for providing a plurality of network interfaces at a common location includes (1) communicatively interfacing a first local area network with a communication service provider's network via a first child gateway of a parent gateway and (2) communicatively interfacing a second local area network with the communication service provider's network via a second child gateway of the parent gateway.

(A2) The method denoted as (A1) may further include establishing a first profile for the first child gateway and establishing a second profile for the second child gateway.

(A3) In the method denoted as (A2), the first profile may specify one or more configurations of the first child gateway, and the second profile may specify one or more configurations of the second child gateway.

(A4) In the method denoted as (A3), (1) the one or more configurations of the first child gateway may include one or more of a service set identifier (SSID), a wireless communication channel configuration, a wireless communication channel width, a wireless communication encryption setting, access controls, a user list, a device list, a firewall list, a network time protocol (NTP) setting, a dynamic host configuration protocol (DHCP) setting, a domain name system (DNS) setting, and a quality of service (QoS) setting, and (2) the one or more configurations of the second child gateway may include one or more of a SSID, a wireless communication channel configuration, a wireless communication channel width, a wireless communication encryption setting, access controls, a user list, a device list, a firewall list, a NTP setting, a DHCP setting, a DNS setting, and a QoS setting.

(A5) Any one of the methods denoted as (A2) through (A4) may further include sending the first profile to the communication service provider for use in establishing the first child gateway at a new location.

(A6) The method denoted as (A5) may further include digitally signing and encrypting the first profile before sending the first profile to the communication service provider.

(A7) Any one of the methods denoted as (A2) through (A4) may further include sending the first profile to another communication service provider for use in establishing the first child gateway at a new location.

(A8) The method denoted as (A7) may further include digitally signing and encrypting the first profile before sending the first profile to the other communication service provider.

(A9) In any one of the methods denoted as (A1) through (A8), the first child gateway may have a first identity with respect to the communication service provider, and the second child gateway may have a second identity with respect to the communication service provider.

(A10) In any one of the methods denoted as (A1) through (A9), the first child gateway may be a first virtual gateway, and the second child gateway may be a second virtual gateway.

(A11) Any one of the methods denoted as (A1) through (A10) may further include: (1) receiving, at the first child gateway, a first digital security certificate issued by the communication service provider, and (2) receiving, at the second child gateway, a second digital security certificate issued by the communication service provider.

(A12) The method denoted as (A11) may further include signing a digital security certificate for a client of the first local area network, using the first digital security certificate at the first child gateway.

(A13) Any one of the methods denoted as (A1) through (A12) may further include: (1) at the first child gateway, exchanging data with the communication service provider's network via a first communication link, and (2) at the second child gateway, exchanging data with the communication service provider's network via the first communication link.

(A14) Any one of the methods denoted as (A1) through (A13) may further include individually provisioning the first child gateway and the second child gateway.

(A15) The method denoted as (A14) may further include provisioning a first bandwidth to the first child gateway and provisioning a second bandwidth to the second child gateway.

(A16) In any one of the methods denoted as (A1) through (A15), the first child gateway may be distributed between the parent gateway and another computing element.

(B1) A method performed by a communication service provider for supporting a plurality of network interfaces at a common location includes (1) exchanging data with a first child gateway of a parent gateway via a first communication link and (2) exchanging data with a second child gateway of the parent gateway via the first communication link.

(B2) The method denoted as (B1) may further include (1) allocating a first portion of a total bandwidth of the first communication link to the first child gateway and (2) allocating a second portion of the total bandwidth of the first communication link to the second child gateway.

(B3) Any one of the methods denoted as (B1) and (B2) may further include (1) assigning a first data cap to the first child gateway and (2) assigning a second data cap to the second child gateway.

(B4) Any one of the methods denoted as (B1) through (B3) may further include (1) sending a first digital certificate to the first child gateway and (2) sending a second digital certificate to the second child gateway.

(B5) In any one of the methods denoted as (B1) through (B4), the first child gateway may have a first identity with respect to the communication service provider, and the second child gateway may have a second identity with respect to the communication service provider.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for providing a plurality of network interfaces at a common location, the method comprising:
   communicatively interfacing a first local area network at a subscriber's location with a communication service provider's network via a first child gateway of a parent gateway;

communicatively interfacing a second local area network at the subscriber's location with the communication service provider's network via a second child gateway of the parent gateway;

serving each of the first child gateway and the second child gateway at the subscriber's location using a common communication link between the communication service provider's network and the parent gateway; and using the communication service provider's network, individually provisioning each of the first child gateway and the second child gateway a respective portion of a total bandwidth of the common communication link between the communication service provider's network and the parent gateway, wherein (i) the parent gateway is located downstream of the communication service provider's network at the subscriber's location, (ii) the second child gateway is at least partially implemented by hardware of the parent gateway, and (iii) the first child gateway is split between the parent gateway and the communication service provider's network.

2. The method of claim 1, further comprising:

establishing a first profile for the first child gateway; and establishing a second profile for the second child gateway.

3. The method of claim 2, wherein:

the first profile specifies one or more configurations of the first child gateway; and the second profile specifies one or more configurations of the second child gateway.

4. The method of claim 3, wherein:

the one or more configurations of the first child gateway comprise one or more of a service set identifier (SSID), a wireless communication channel configuration, a wireless communication channel width, a wireless communication encryption setting, access controls, a user list, a device list, a firewall list, a network time protocol (NTP) setting, a dynamic host configuration protocol (DHCP) setting, a domain name system (DNS) setting, and a quality of service (QoS) setting; and the one or more configurations of the second child gateway comprise one or more of a SSID, a wireless communication channel configuration, a wireless communication channel width, a wireless communication encryption setting, access controls, a user list, a device list, a firewall list, a NTP setting, a DHCP setting, a DNS setting, and a QoS setting.

5. The method of claim 2, further comprising sending the first profile to the communication service provider for use in establishing the first child gateway at a new location.

6. The method of claim 5, further comprising digitally signing and encrypting the first profile before sending the first profile to the communication service provider.

7. The method of claim 2, further comprising sending the first profile to another communication service provider for use in establishing the first child gateway at a new location.

8. The method of claim 7, further comprising digitally signing and encrypting the first profile before sending the first profile to the other communication service provider.

9. The method of claim 1, wherein:

the first child gateway has a first identity with respect to the communication service provider; and the second child gateway has a second identity with respect to the communication service provider.

10. The method of claim 1, wherein:

the first child gateway is a first virtual gateway; and the second child gateway is a second virtual gateway.

11. The method of claim 1, further comprising:

receiving, at the first child gateway, a first digital security certificate issued by the communication service provider; and receiving, at the second child gateway, a second digital security certificate issued by the communication service provider.

12. The method of claim 11, further comprising signing a digital security certificate for a client of the first local area network, using the first digital security certificate at the first child gateway.

13. The method of claim 1, further comprising:

at the first child gateway, exchanging data with the communication service provider's network via the common communication link between the communication service provider's network and the parent gateway; and at the second child gateway, exchanging data with the communication service provider's network via the common communication link between the communication service provider's network and the parent gateway.

14. A method performed by a communication service provider for supporting a plurality of network interfaces at a common location, the method comprising:

exchanging data with a first child gateway of a parent gateway via a first communication link between a network of the communication service provider and the parent gateway, the first child gateway communicatively interfacing a first local area network at a subscriber's location with the network of the communication service provider;

exchanging data with a second child gateway of the parent gateway via the first communication link between the network of communication service provider and the parent gateway, the second child gateway communicatively interfacing a second local area network at the subscriber's location with the network of the communication service provider; and individually provisioning each of the first child gateway and the second child gateway a respective portion of a total bandwidth of the first communication link between the network of the communication service provider and the parent gateway, wherein:

the parent gateway is located at the subscriber's location and is downstream of the network of the communication service provider, the second child gateway is at least partially implemented by hardware of the parent gateway, and the first child gateway is split between the parent gateway and the network of the communication service provider.

15. The method of claim 14, further comprising:

assigning a first data cap to the first child gateway; and assigning a second data cap to the second child gateway.

16. The method of claim 14, further comprising:

sending a first digital certificate to the first child gateway; and sending a second digital certificate to the second child gateway.

17. The method of claim 14, wherein:

the first child gateway has a first identity with respect to the communication service provider; and the second child gateway has a second identity with respect to the communication service provider.

\* \* \* \* \*